(12) United States Patent
Zhang et al.

(10) Patent No.: US 12,498,858 B2
(45) Date of Patent: Dec. 16, 2025

(54) IO REQUEST PROCESSING METHOD, APPARATUS AND SYSTEM FOR MULTI-PATH STORAGE AND STORAGE MEDIUM

(71) Applicant: SUZHOU METABRAIN INTELLIGENT TECHNOLOGY CO., LTD., Jiangsu (CN)

(72) Inventors: Zhenguang Zhang, Jiangsu (CN); Ruipeng Feng, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/878,035

(22) PCT Filed: Nov. 15, 2023

(86) PCT No.: PCT/CN2023/131757
§ 371 (c)(1),
(2) Date: Dec. 21, 2024

(87) PCT Pub. No.: WO2024/164614
PCT Pub. Date: Aug. 15, 2024

(65) Prior Publication Data
US 2025/0165150 A1 May 22, 2025

(30) Foreign Application Priority Data
Feb. 8, 2023 (CN) .......................... 202310084949.3

(51) Int. Cl.
*G06F 3/06* (2006.01)
(52) U.S. Cl.
CPC .......... *G06F 3/0613* (2013.01); *G06F 3/0635* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 2002/0166005 A1* | 11/2002 | Errico | ................... | G06F 9/5011 |
| | | | | 710/38 |
| 2017/0063963 A1* | 3/2017 | Corrao | ................... | G06F 16/95 |

(Continued)

FOREIGN PATENT DOCUMENTS

| | | | |
|---|---|---|---|
| CN | 105430103 A | 3/2016 |
| CN | 106873907 A | 6/2017 |

(Continued)

OTHER PUBLICATIONS

Changjun Fan, et al. "Multi-Path Storage System Based on ALUA." Computer Systems and Applications, 2017, 26 (10):11-19. Oct. 15, 2017.

*Primary Examiner* — Arpan P. Savla
*Assistant Examiner* — Edmund H Kwong
(74) *Attorney, Agent, or Firm* — IPro, PLLC

(57) ABSTRACT

The present disclosure relates to the technical field of data storage, and provides an IO request processing method, apparatus and system for multi-path storage and a storage medium, which are intended to improve IO efficiency of processing requests. When the method is applied to a storage system, the method includes: dividing a target volume to obtain a plurality of segments; determining a mapping relationship between the plurality of segments and a plurality of storage nodes, the mapping relationship being used for identifying an optimal storage node mapped by a segment in the plurality of storage nodes; detecting states of the plurality of storage nodes; adjusting the mapping relationship on the basis of respective detected state parameters of the plurality of storage nodes and/or path switching information sent by a host; and sending the adjusted mapping relation- (Continued)

ship to the host, so that the host, on the basis of the adjusted mapping relationship, sends an IO request for a segment to a path device corresponding to the optimal storage node.

14 Claims, 3 Drawing Sheets

(56) References Cited

U.S. PATENT DOCUMENTS

| | | | |
|---|---|---|---|
| 2017/0195420 A1* | 7/2017 | Resch | G06F 3/0623 |
| 2021/0297363 A1* | 9/2021 | Charles | H04L 47/726 |
| 2022/0206871 A1 | 6/2022 | Armangau et al. | |
| 2023/0297238 A1* | 9/2023 | Mallick | G06F 3/061 |
| | | | 711/162 |
| 2023/0350572 A1* | 11/2023 | Dor | G06F 3/0659 |

FOREIGN PATENT DOCUMENTS

| | | |
|---|---|---|
| CN | 110007877 A | 7/2019 |
| CN | 111782137 A | 10/2020 |
| CN | 111782138 A | 10/2020 |
| CN | 114595167 A | 6/2022 |
| CN | 115098028 A | 9/2022 |
| CN | 115373843 A | 11/2022 |
| CN | 115617278 A | 1/2023 |
| CN | 116048413 A | 5/2023 |

* cited by examiner

IO REQUEST PROCESSING METHOD, APPARATUS AND SYSTEM FOR MULTI-PATH STORAGE AND STORAGE MEDIUM

CROSS-REFERENCE TO RELATED APPLICATION

This application claims the priority of Chinese patent application filed in CNIPA on Feb. 8, 2023 with the application number of 202310084949.3 and the application name of "IO request processing method, apparatus and system for multi-path storage and storage medium", the entire contents of which are incorporated into this application by reference.

FIELD

The invention relates to the technical field of data storage, in particular to an IO request processing method, apparatus and system for multi-path storage and storage medium.

BACKGROUND

In a SAN (Storage Area Network) environment composed of optical fibers or an environment composed of an iSCSI (Internet Small Computer System Interface), since a host (which may be a server) and a storage are connected through an optical fiber switch or a plurality of network cards and IP (Internet Protocol), a many-to-many relationship is formed, and accordingly a multi-path relationship between the host and the storage is formed.

At present, in an application of multi-path, an optimal path of IO (Input Output) request will be determined. In the related art, generally, a storage system determines an optimal storage node corresponding to a plurality of segments of a volume, and then informs a host, and the host sends the IO request to a corresponding target device based on corresponding relationship between the storage node and a plurality of multi-path devices on the host according to the optimal storage node corresponding to the segments notified by the storage system, and then process the IO request by a target device.

However, in this way, only one scheme may be implemented mechanically in an actual operation process, and resources of each storage node of the storage system and performance of each path device on the host are not fully utilized, which often leads to a fact that some IO requests in one volume are processed quickly, while processing time of other IO requests is long, thereby reducing efficiency of processing IO requests on the volume.

SUMMARY

The present disclosure provides an IO request processing method for multi-path storage, which is applied to a storage system, wherein the storage system is connected to a host in communication, and the storage system includes a plurality of storage nodes, and the method includes:
dividing a target volume to obtain a plurality of segments; wherein the target volume is mapped with a plurality of path devices on the host, and the plurality of path devices correspond to a plurality of storage nodes respectively;
determining a mapping relationship between the plurality of segments and the plurality of storage nodes; wherein the mapping relationship is used to identify an optimal storage node mapped by the segment in the plurality of storage nodes;
detecting states of the plurality of storage nodes;
adjusting the mapping relationship based on respective detected state parameters of the plurality of storage nodes and/or path switching information sent by the host; wherein, the path switching information is used to indicate switching of the path devices that process the IO request of the segments;
sending the adjusted mapping relationship to the host, so that the host sends the IO request for the segment to the path device corresponding to the optimal storage node based on the adjusted mapping relationship.

On the second aspect of the embodiments, provided an IO request processing method for multi-path storage, which is applied to a host, the host is connected to a storage system, and the storage system includes a plurality of storage nodes, wherein the method includes:
determining a plurality of path devices corresponding to a target volume in the storage system, wherein the target volume is divided into a plurality of segments and stored on the plurality of storage nodes, and the plurality of storage nodes respectively correspond to the plurality of path devices;
detecting respective efficiency of processing requests of the plurality of the path devices;
generating path switching information for path devices based on a detection result, wherein the path switching information is used to indicate switching of the path devices that process an IO request of the segments;
sending the IO request for the segments to switched path devices based on the path switching information, and/or sending the IO request for the segments to the path device corresponding to an optimal storage node based on mapping relationship sent by the storage system;
wherein the optimal storage node is the storage node corresponding to the segment in the mapping relationship.

On the third aspect of the present disclosure, provided a processing system including a storage system and a host, wherein:
the storage system is configured to execute the IO request processing method for multi-path storage according to the first aspect;
the host is configured to execute the IO request processing method for multi-path storage according to the second aspect.

On the fourth aspect of the present disclosure, provided an IO request processing apparatus for multi-path storage, which is applied to a storage system, wherein the storage system is connected to a host in communication, and the storage system includes a plurality of storage nodes, wherein the apparatus includes:
a dividing module, configured to divide a target volume to obtain a plurality of segments; wherein the target volume is mapped with a plurality of path devices on the host, and the plurality of path devices correspond to a plurality of storage nodes respectively;
a relationship determination module, configured to determine a mapping relationship between the plurality of segments and the plurality of storage nodes; wherein the mapping relationship is used to identify an optimal storage node mapped by the segment in the plurality of storage nodes;
a first detection module, configured to detect states of the plurality of storage nodes;

a relationship adjustment module, configured to adjust the mapping relationship based on respective detected state parameters of the plurality of storage nodes and/or path switching information sent by the host; wherein, the path switching information is used to indicate switching of the path devices that process the IO request of the segments;

a relationship sending module, configured to send the adjusted mapping relationship to the host, so that the host sends the IO request for the segment to the path device corresponding to the optimal storage node based on the adjusted mapping relationship.

On the fifth aspect of the present disclosure, provided an IO request processing apparatus for multi-path storage, which is applied to a host, the host is connected to a storage system, and the storage system includes a plurality of storage nodes, wherein the apparatus includes:

a configuration module, configured to determine a plurality of path devices corresponding to a target volume in the storage system, wherein the target volume is divided into a plurality of segments and stored on the plurality of storage nodes, and the plurality of storage nodes respectively correspond to the plurality of path devices;

a second detection module, configured to detect respective efficiency of processing requests of the plurality of the path devices;

a switching module, configured to generate path switching information for path devices based on a detection result, wherein the path switching information is used to indicate switching of the path devices that process an IO request of the segments;

a dispatching module, configured to send the IO request for the segments to switched path devices based on the path switching information, and/or sending the IO request for the segments to the path device corresponding to an optimal storage node based on mapping relationship sent by the storage system; wherein the optimal storage node is the storage node corresponding to the segment in the mapping relationship.

The present disclosure also discloses a non-transitory computer readable storage medium, wherein a computer program stored therein causes a processor to execute the multi-path storage IO request processing method according to the first aspect, or to execute the multi-path storage IO request processing method according to the second aspect.

By adopting the technical solution of the embodiments of the present disclosure, a plurality of segments obtained by dividing the target volume and the mapping relationship between a plurality of storage nodes may be determined; Next, the states of the plurality of storage nodes are detected; And adjusting the mapping relationship based on the detected respective state parameters of the plurality of storage nodes and/or the path switching information of the target IO request for the target segment sent by the host; Then, the adjusted mapping relationship is sent to the host, so that the host may send the IO request for the segment to the path device corresponding to the optimal storage node according to the adjusted mapping relationship.

On the one hand, since the mapping relationship may be adaptively adjusted according to the states of the storage nodes, in this way, the optimal storage node corresponding to the segment may be dynamically adjusted, thereby making full use of the resources of each storage node and adapting to the states of the storage nodes.

On the other hand, since the host side will also determine to switch the path of the target IO request according to the efficiency of processing requests of a plurality of path devices, the storage system may also adjust the mapping relationship according to the path switching information of the host, to adapt this mapping relationship to the performance of each path device on the host, thereby improving processing efficiency of IO requests.

By adopting the technical solution of the embodiments of the present disclosure, a multi-path selection strategy of the target volume may be dynamically optimized from the host side and the storage system side, so that a reading and writing operation process of the target volume may fully adapt to the state of each storage node in the storage system and the performance of each path device on the host, thereby improving the processing efficiency of reading and writing the target volume.

The above description is only an overview of the technical solution of the present disclosure, which may be implemented according to the contents of the specification in order to understand the technical means of the present disclosure clearer, and in order to make the above and other purposes, features and advantages of the present disclosure more obvious and understandable, the following is specific embodiments of the present disclosure.

BRIEF DESCRIPTION OF THE DRAWINGS

In order to clearly explain the technical solution in the embodiments of the present disclosure or related art, the drawings needed to be used in the description of the embodiments or related art will be briefly introduced below. Apparently, the drawings in the following description are some embodiments of the present disclosure, and other drawings may be obtained according to these drawings without expenditure of creative labor for persons skilled in the art. It should be noted that the dimensions and shapes of the figures in the appended drawings do not reflect the true scale, and are only intended to schematically illustrate the contents of this application. The same or similar reference numerals in the drawings indicate the same or similar elements or elements with the same or similar functions.

Figure 1:
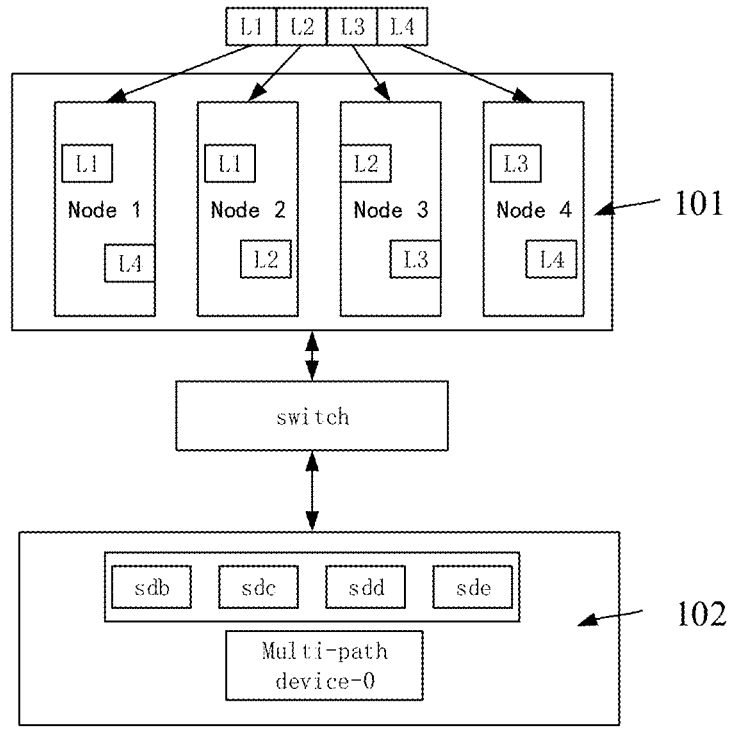
FIG. 1 schematically shows a communication environment diagram of a processing system according to a third embodiment of the present disclosure.

Description of reference numerals: 101—storage system, 102—host.

DETAILED DESCRIPTION

In order to make the purpose, technical solution and advantages of the embodiment of the disclosure clearer, the technical solution in the embodiment of the disclosure will be described clearly and completely with the attached drawings. Apparently, the described embodiment is a part of the embodiment of the disclosure, but not the whole embodiment. Based on the embodiments in the present disclosure, all other embodiments obtained by persons skilled in the art without expenditure of creative labor belong to the protection scope of the present disclosure.

Firstly, the multi-path storage in related art is introduced.

Multi-path refers to a physical connection of a plurality of transport layers between a host (such as a server) and a storage system, which provides higher availability and performance advantages for the storage system. Generally, the selection of the optimal path device is realized by a multi-path software, which is installed on the host end and may aggregate a plurality of devices into one device.

High availability of multi-path software is reflected in the fact that when a controller, a port and a switch between the host and the storage system fail, the link will be blocked, and IO requests may be sent through other links at this time, thus avoiding an interruption of data access between the host and the storage system caused by a single point of failure.

Performance advantage of high throughput of the multi-path software is that IO requests from the host to the storage system may be sent simultaneously through a plurality of links, which improves the reading and writing efficiency of data on the host.

The path device is located on the host, which corresponds to a volume on the storage system, that is, if there are four links between the host and the storage system, after a volume on the storage system is mapped to the host, the host may configure four path devices for it. These path devices are integrated into a multi-path device, which corresponds to the volume and may be named as a multi-path device-X (for example, multi-path device-0), and X identifies a volume. That is, a volume may be mapped to four path devices on a host, which may form four storage links of the volume (one path device corresponds to one storage link).

In the related art, for a volume, it may be divided into a plurality of segments, for example, the volume will be divided into a plurality of segments according to a size of 32M, in which each volume of the storage system may be saved in a form of circular mirror pairs, that is, one segment may be mirror-stored in a plurality of storage nodes of the storage system. For example, the storage system includes four storage nodes, namely Node 1, Node 2, Node 3 and Node 4, which are divided into four groups of mirror relationships, as follows:

mirror relationship 1: (Node 1, Node 2),
mirror relationship 2: (Node 2, Node 3),
mirror relationship 3: (Node 3, Node 4),
mirror relationship 4: (Node 4, Node 1).

Each segment obtained by division corresponds to a set of mirror relationships. For example, the volume is divided into four segments to obtain four segments, including L1, L2, L3 and L4, where L1 corresponds to the mirror relationship 1, that is, L1 is stored in Node 1 and Node 2, L2 corresponds to the mirror relationship 2, that is, L2 is stored in Node 2 and Node 3, and so on, L3 is stored in Node 3 and Node 4, and L4 is stored in Node 1 and Node 4.

Because there is a one-to-one correspondence between storage nodes and path devices, each storage node corresponds to a path device on the host when the volume is IO operated. Assuming that there are also four path devices for the volume on the host, the link from Node 1 may correspond to the path device sdb, the link from Node 2 to the path device sdc, the link from Node 3 to the path device sdd, and the link from Node 4 to the path device sde. It should be noted that sdb, sdc, sdd and sde in the present disclosure are just names set for convenience of identifying different path devices. In other embodiments, other English letters may also be used to identify path devices, which does not mean that there are special restrictions.

When processing the IO request for the volume, an optimal path of each segment may be determined, which is an optimal storage node of the segment and a corresponding optimal path device. In this way, when an IO request for a segment arrives, the IO request may be sent to the optimal path device of the segment first, and then the optimal path device performs a writing or reading operation on the segment stored in the optimal storage node, wherein the writing operation may refer to writing data into the segment stored in the optimal storage node, and the reading operation may refer to reading the segment stored in the optimal storage node into the optimal path device to write the target volume to the host.

However, in the related art, the optimal path information of the volume is unchanged, that is, the optimal path device of L1 is always sdb, and the optimal path device of L2 is always sdc. However, in different states of the storage system, the performance of the optimal storage node and the optimal path device of each segment of the volume changes, so fixed optimal path information may not adapt to this situation, which leads to the reduction of the efficiency of I/O request processing for the volume.

Secondly, after the IO request is sent to the optimal path device according to the optimal path information, the state of the host changes in real time, and there will be many IO tasks are backlog on a device. As a result, some IO requests in one volume are processed quickly, while others take a long time to process, which will reduce the processing efficiency of IO requests on the volume, thereby causing the processing capacity of the host to decline.

In view of this, the present disclosure proposes a technical solution to improve the processing efficiency of IO requests for volumes. The main technical means of this technical solution are: the storage system may adjust the mapping relationship according to the state parameters of each storage node, and/or, the host detects the efficiency of processing requests of a plurality of path devices to switch the path devices corresponding to some target IO requests, thus instructing the storage system to switch the storage nodes corresponding to the segments targeted by the target IO requests in the mapping relationship. In this way, the storage system may also adjust the mapping relationship according to the path switching information of the host, so that the optimal storage node corresponding to the segment will be dynamically adjusted, so that the mapping relationship, that is, the optimal path information, is dynamically adapted to the state of each storage node and the performance of the host, and the IO processing efficiency of the volume is improved.

It should be noted that the IO request described in the present disclosure may include a reading request and a writing request. The reading request is a request for reading data, and the writing request is a request for writing data. For an IO request, it may be either a reading request or a writing request. Both the reading request and the writing request may be processed according to the method of the present disclosure. For example, for a reading request, the segment targeted by the reading request may be determined and then sent to the optimal path device corresponding to the segment, and the optimal path device reads data in the optimal storage node. For the writing request, the segment to which the writing request is targeted may be determined and then the writing request is sent to the optimal path device corresponding to the segment, and the optimal path device writes data in the optimal storage node.

Referring to FIG. 1, a communication environment diagram of the IO request processing method for multi-path storage of the present disclosure is shown, which includes a storage system 101, a host 102 and a switch. Wherein, the storage system includes a plurality of storage nodes, and a plurality of path devices are mapped on the host for a volume in the storage system. FIG. 1 takes the storage system as an example, in which four storage nodes may be called Node 1, Node 2, Node 3 and Node 4 respectively. After the storage system establishes path links with the host, each link corresponds to a path device, and the plurality of path devices of each volume are aggregated to become a multi-path device, That is, a volume on the storage system is mapped to the host and corresponds to four path devices. FIG. 1 shows path devices sdb, sdc, sdd, and sde. Wherein, a path device corresponds to a storage node in the storage system, and information interaction is carried out between the host and the storage system through a switch.

The storage system may be a distributed storage system, and a storage node may be a storage device in the distributed storage system, for example, it may be a personal computer (PC).

With reference to FIG. 1, the IO request processing method for multi-path storage disclosed in the present disclosure is introduced.

Figure 2:
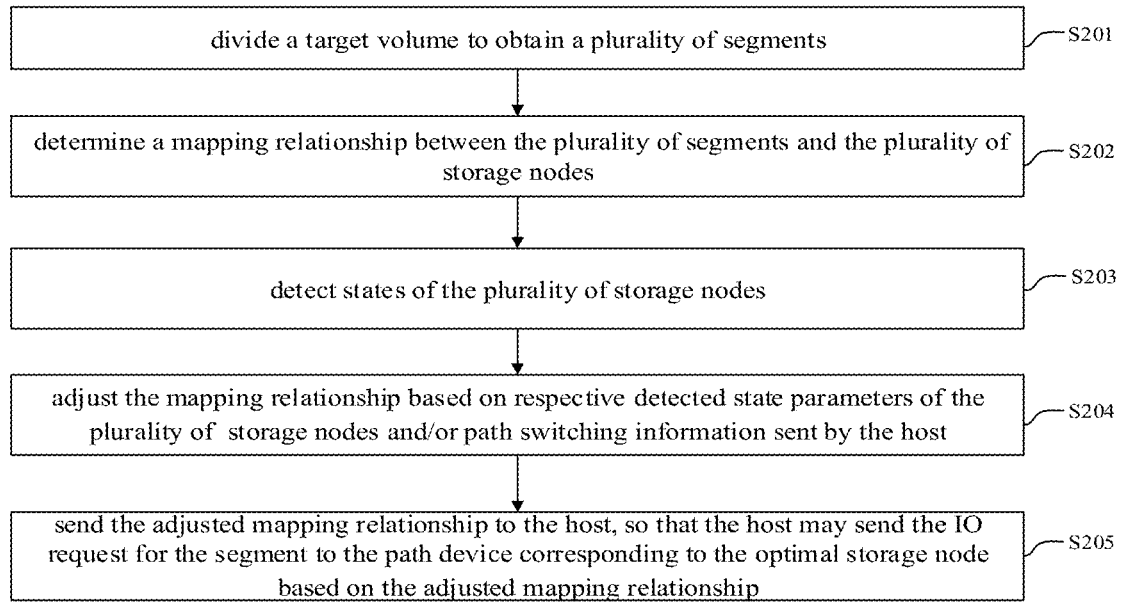
FIG. 2 schematically shows a flowchart of steps of an IO request processing method for multi-path storage according to a first embodiment of the present disclosure.

Referring to FIG. 2, it shows a schematic flow chart of steps of an IO request processing method for multi-path storage in a first embodiment, as shown in FIG. 2, which specifically includes the following steps:

step S201: dividing a target volume to obtain a plurality of segments;

wherein the target volume is mapped with a plurality of path devices on the host, and the plurality of path devices correspond to a plurality of storage nodes respectively.

In this embodiment, the target volume is a volume on the storage system, and the volume may be actually divided. When dividing, the target volume may be divided into a plurality of segments according to a certain size, for example, it may be divided according to a size of 32M and a size of 48M, and a number of segments obtained after division may be greater than or equal to a number of storage nodes. After obtaining the plurality of segments, the corresponding relationship between the plurality of segments and the plurality of storage nodes may be determined. Specifically, one segment may correspond to the plurality of storage nodes, so that the storage nodes may store the segment in a mirror image, and one storage node may correspond to one or more segments, so that one storage node may store the plurality of segments.

Illustratively, suppose that the volume is divided into 10 segments according to the size of 32M, and the storage system includes four storage nodes, then one storage node corresponds to at least two segments, and one segment may correspond to two storage nodes, to mirror storage.

Step S202: determining a mapping relationship between the plurality of segments and the plurality of storage nodes.

The mapping relationship is used to identify an optimal storage node mapped by the segment in the plurality of storage nodes.

After determining the corresponding relationship between the plurality of segments and the plurality of storage nodes, it is necessary to determine the optimal storage node and optimal path device for each segment, thus forming the mapping relationship between storage nodes and segments. Wherein, the plurality of storage nodes and the plurality of path devices may have a one-to-one relationship, that is, one storage node corresponds to one path device and one path device only corresponds to one storage node. When the optimal storage node of the segment is determined, the optimal path device is determined. Certainly, in some cases, the one-to-one relationship between storage nodes and path devices may be dynamic, that is, the path device corresponding to a storage node may change at some time. For example, the path device corresponding to storage Node 1 is sdb, so it may correspond to sdc at some time. Specifically, the one-to-one relationship between storage nodes and path devices may be changed based on the performance of storage nodes and the performance of path devices. For example, if storage nodes and path devices with similar efficiency in processing IO requests correspond to each other, their progress in processing IO requests may be consistent, thus improving the processing efficiency of IO requests.

When the optimal storage node mapped by each segment is determined for the first time, it may be mapped according to preset mapping rules. In practice, the preset rules may be mapping according to a label of the segment and a label of the storage node. For example, if the target volume is divided into 10 segments, the labels of the segments may be L1 to L10, and the storage nodes are Node 1, Node 2, Node 3 and Node 4 respectively. Then L1 may be mapped to Node 1, L2 to Node 2, L3 to Node 3, L4 to Node 4, and L5 to Node 1, and so on, and the optimal storage nodes corresponding to each of the 10 segments may be obtained.

As mentioned above, the mapping relationship is used to identify the processing path of IO requests for a segment, and the processing path is the optimal processing path corresponding to the segment, and may also be understood as an optimal link of IO requests from the host to the path device to the storage node. Illustratively, L1 is mapped to Node 1. According to the correspondence between storage nodes and path devices, IO requests for L1 will be processed in the link between sdb and Node 1.

It may be understood that in the mapping relationship, one segment corresponds to an optimal storage node, and one storage node may be actually the optimal storage node of the plurality of segments.

After determining the mapping relationship, the mapping relationship may be sent to the host to instruct the host to send a plurality of IO requests to the corresponding path devices according to the segments targeted by the plurality of IO requests based on the mapping relationship, so that the path devices may process the corresponding IO requests.

In this embodiment, the storage system may send the mapping relationship to the host, and the host may send a plurality of received IO requests based on the mapping relationship. When sending, it may determine the segment targeted by the IO request and the storage node and path device corresponding to the segment in the mapping relationship, and then send the IO request to the corresponding path device, and the path device performs reading and writing operations on the corresponding storage node. For example, read the segment from the storage node to the path device (data reading request, corresponding to Output), or write the data to be written to the path device and the storage node (data writing request, corresponding to input).

Step S203: detecting states of the plurality of storage nodes.

In this embodiment, after determining the mapping relationship between segments and storage nodes for the first time, the storage system will start to detect the states of storage nodes, wherein the detection may be a real-time detection or a periodic detection, and the real-time detection may detect the states of storage nodes in real time, while the periodic detection may detect the states of storage nodes once every preset time.

Because the storage system will adjust the mapping relationship according to the detected state of the storage node in later period, in some examples, the storage system may periodically detect the state of the storage node, thus avoiding a problem that when the mapping relationship is frequently switched, the dispatching of IO requests needs to be changed frequently, which will lead to high load of the host and affect the efficiency of IO requests.

Step S204: adjusting the mapping relationship based on respective detected state parameters of the plurality of storage nodes and/or path switching information sent by the host.

The path switching information is generated based on the efficiency of processing requests of the plurality of path devices, and is used to indicate the switching of the path devices that process the IO request of the segments.

In this embodiment, the storage system itself detects the states of a plurality of storage nodes, and then the state parameters of each storage node may be obtained, which may indicate the current performance of the storage node. In practice, the state parameters may include a memory usage of the storage node, a busy degree of the processor, etc. If a storage node uses more memory and the processor is busy, it indicates that the state of the storage node is busy, and its ability to handle subsequent IO requests is weak, so it is necessary to timely switch the segment corresponding to the storage node to the other corresponding optimal storage node. On the other hand, if a storage node uses less memory and the processor is not busy, it means that the storage node is idle and has strong processing ability for subsequent IO requests, so it is unnecessary to replace the optimal storage node.

In practice, on an opposite host, the host may also detect the processing efficiency (efficiency of processing requests) of the path device in processing IO requests. According to a detection result, the IO requests in the path device with low efficiency of processing requests may be transferred to the path device with high efficiency of processing requests, that is, the IO requests in the path device with low processing efficiency may be dispatched for a second time. Correspondingly, the host will generate path switching information based on the path device with low processing efficiency. The path switching information may indicate the path device to move out of the IO request (hereinafter referred to as a first path device) and the path device to receive the transferred IO request (hereinafter referred to as a second path device).

In practice, the storage system may adjust the mapping relationship according to the detected state parameters of the plurality of storage nodes, or according to the path switching information sent by the host for the path device, or according to the detected state parameters of the plurality of storage nodes and the path switching information. In this case, the mapping relationship may be adjusted first based on the respective state parameters of the plurality of storage nodes, and then adjusted again based on the received path switching information.

When the mapping relationship is adjusted according to the respective detected state parameters of a plurality of storage nodes, the storage nodes with poor state performance and the storage nodes with good state performance may be determined, and then the mapped segment of the storage node with poor state performance is adjusted to map the segment with the storage node with good state performance. As in the above embodiments, since each segment may be mirrored on a plurality of storage nodes, in some embodiments, both the storage node with poor state performance and the storage node with good state performance may store the same segment, so that the distributed processing of each segment of the target volume may be achieved.

Certainly, in some embodiments, in order to make reasonable and full use of the resources of storage nodes, a segment may be stored on at least three storage nodes, so that the optimal storage node of a segment may have more choices when adjusting the mapping relationship.

When the mapping relationship is adjusted according to the path switching information sent by the host, the storage node corresponding to the first path device and the storage node corresponding to the second path device may be determined, and then the mapped segment of the first path device may be adjusted to be mapped to the second path device.

In practice, since a storage node may be actually the optimal storage node for the plurality of segments, when the mapping relationship is adjusted according to the path switching information, the segment targeted by the delayed IO request in the storage nodes corresponding to the first path device may be adjusted to be mapped to the storage node corresponding to the second path device, so that the second path device and the storage nodes corresponding to the second path device may be the optimal storage node and optimal path device for the segment.

Step S205: sending the adjusted mapping relationship to the host, so that the host may send the IO request for the segment to the path device corresponding to the optimal storage node based on the adjusted mapping relationship.

In this embodiment, the adjusted mapping relationship may be sent to the host, and the host may send a plurality of IO requests to the corresponding path devices according to the adjusted mapping relationship. In practice, the host is configured with a multi-path software. When the storage system sends the adjusted mapping relationship to the host, the multi-path software on the host may dispatch and correct a multi-link dispatching of IO requests according to the adjusted mapping relationship, to send IO requests for each segment to the corresponding optimal path device and optimal storage node according to the latest mapping relationship.

By adopting the technical solution of the embodiment of the present disclosure, for a storage system, the mapping relationship may be adjusted in time in combination with the real-time state of the storage system, so that IO requests for each segment may always be dispatched to path devices and storage nodes with better performance, thereby improving the processing efficiency of IO requests.

In this embodiment, the storage system may adjust the mapping relationship based on the detected state parameters of a plurality of storage nodes; The mapping relationship may also be adjusted according to the path switching information sent by the host; The mapping relationship may also be adjusted based on the detected state parameters of the plurality of storage nodes and the path switching information sent by the host. In this case, the mapping relationship may be adjusted based on the state parameters of the plurality of storage nodes first, and then adjusted based on the received path switching information.

Below, the above situation will be explained separately.

I. According to the detected state parameters of the plurality of storage nodes, the mapping relationship may be adjusted as follows.

In some embodiments, based on the state parameters of each storage node, the storage node with poor state performance may be determined, and the segment mapped by the storage node with poor state performance in the mapping relationship is switched to be mapped with another storage node with good state performance, that is, the optimal storage node of the segment is switched in time, so that the first segment is always mapped to a storage node with better state performance as the optimal storage node.

In concrete implementation, the first storage node and the second storage node may be determined based on their respective state parameters, and the target segment to which the first storage node is mapped may be determined based on the mapping relationship, and the second storage node may be adjusted as the optimal storage node corresponding to the target segment.

The performance of the second storage node in processing IO requests is higher than that of the first storage node.

In this embodiment, as mentioned above, the state parameter may indicate the current performance of the storage node, and in practice, the state parameter may indicate a memory usage of the storage node, a busy degree of the processor, etc. Therefore, based on the respective state parameters of the plurality of storage nodes, the storage node with poor state performance may be taken as a first storage node to be switched, and the storage node with good state performance may be taken as a second storage node to be switched to. Wherein, the storage node with better state performance has higher performance in processing IO requests, that is, it has stronger ability in processing IO requests. In practice, the target segment to which the first storage node is mapped may be switched to be mapped with the second storage node.

The first storage node may be mapped with the plurality of segments, that is, it may be used as the optimal storage node for the plurality of segments. In practice, when adjusting the mapping relationship of the first storage node, part or all of the target segments in the first storage node may be mapped to the second storage node. In some embodiments, the number of target segments to be adjusted may be determined according to the state parameters of the first storage node. For example, if the state parameters of the first storage node indicate that the first storage node may be down, then the first storage node is temporarily unable to process the IO request of the segment, and all the target segments in the first storage node may be mapped to the second storage node. For example, if the state parameter of the first storage node indicates that the first storage node is busy, and its processing capacity will be reduced but it will not be down, then the first storage node can currently process IO requests, and then some target segments in the first storage node may be mapped to the second storage node. For example, one target segment may be mapped to the second storage node, thus on the one hand, it can reduce a processing pressure of the first storage node, and on the other hand, it can avoid a problem that too many target segments are mapped to the second storage node, resulting in a sudden increase in a busy level of the second storage node and a decrease in processing efficiency.

Certainly, in some other embodiments, if a segment is mirrored to at least three storage nodes, the target segments to which the first storage node is mapped may be adjusted to mapping the plurality of target segments to the plurality of second storage nodes respectively. That is, before adjustment, the target segment is mapped to the first storage node, and after adjustment, the target segment is mapped to the second storage node.

Illustratively, if the target volume is divided into 10 segments, the labels of the segments may be L1 to L10, and the storage nodes are Node 1, Node 2, Node 3 and Node 4 respectively, where L1 and L5 and L9 correspond to Node 1-Node 3 and L2 and L6 correspond to Node 2-Node 4, wherein the optimal storage node of L1 and L5 is Node 1, and so on, assuming that Node 1 is determined as the first storage node, Nodes 2 and 3 in the remaining nodes may be used as the second storage nodes, so L1 may be mapped to Node 2, that is, Node 2 may be used as the optimal storage node of L1, and L5 may be mapped to Node 3, that is, Node 3 may be used as the optimal storage node of L5, while L9 may still use Node 1 as the optimal storage node.

In one embodiment, when determining the first storage node and the second storage node, the state performance of each storage node may be sorted according to their respective state parameters, and the first storage node and the second storage node may be determined according to a sorting result. Wherein, when sorting, it may be sorted from high to low in state performance or from low to high in state performance, and then the storage node with poor state performance may be selected as the first storage node and the storage node with good state performance as the second storage node.

In concrete implementation, the state performance of each storage node may be scored according to its respective state parameters, and each storage node may be sorted according to a score.

In some embodiments, performance scores corresponding to the plurality of storage nodes may be determined based on their respective state parameters; Determining a first storage node and a second storage node based on a preset score threshold and respective corresponding performance scores of the plurality of storage nodes.

In this embodiment, the state parameters may be expressed by numerical values, such as percentages or natural numbers. If the state parameters represent a busy degree of storage nodes, the higher the values of the state parameters corresponding to storage nodes with poor state performance, and thus the lower the performance score; If the state parameters represent a utilization rate of a remaining memory of the storage node, the lower the values of the state parameters corresponding to the storage nodes with poor state performance, and thus the lower the performance score.

The preset score threshold may be set according to an actual requirement. Generally speaking, if the performance score of a storage node exceeds the preset score threshold, it means that the storage node may be used as the second storage node without switching. If the performance score of a storage node is lower than the preset score threshold, it indicates that the storage node may need to be switched.

In this embodiment, a storage node whose performance score exceeds the preset score threshold may be used as the second storage node, and a storage node whose performance score is lower than the preset score threshold may be used as the first storage node. Wherein, one or more first storage nodes may be determined in one detection, and if it is a first storage node, the first storage node may be the storage node with the lowest performance score below the preset score threshold. If there are a plurality of first storage nodes, the plurality of first storage nodes may be storage nodes whose performance score is lower than the preset score threshold and is ranked behind.

In some embodiments, when determining the first storage node and the second storage node according to the performance score, the storage node whose performance score is smaller than the preset score threshold and whose performance score is the smallest may be determined as the first storage node; And determining a second storage node from storage nodes whose performance score is greater than or equal to a preset score threshold.

In one case, the second storage node may be the storage node with the highest performance score or any storage node with a performance score higher than the preset score threshold. As described above, the second storage node may also include a plurality of storage nodes.

Based on the performance score and the preset score threshold, the second storage node with good state performance and the first storage node with poor state performance may be quickly screened out, thus improving the efficiency of mapping relationship adjustment and enabling the mapping relationship to be adjusted in time.

In some cases, the state parameter may also include at least one of a processor busy parameter value, a memory usage rate and a network busy parameter value.

In some embodiments, the state parameters include at least two of the processor busy parameter value, the memory usage rate and the network busy parameter value, and in the case of at least the above two, an initial performance score of each storage node may be determined based on at least two of the processor busy parameter value, the memory usage rate and the network busy parameter value corresponding to each storage node; And based on the initial performance score respectively corresponding to the storage nodes, the performance scores respectively corresponding to the storage nodes are determined.

In this embodiment, the processor busy parameter value may indicate a busy degree of the processor of the storage node in a unit time; The memory usage rate may indicate a usage degree of the memory of the storage node in a unit time, and the network busy parameter value may indicate a degree wherein a network bandwidth is occupied by the storage node in a unit time. These parameter values may represent the current performance state of the storage node, reflect an amount of IO requests the processor process, and thus reflect a subsequent ability of the storage node to process IO requests.

An average score of at least two of the processor busy parameter value, memory usage rate and network busy parameter value may be taken as the initial performance score of the storage node. Specifically, for the convenience of calculation, the processor busy parameter value, memory usage rate and network busy parameter value may all adopt the same metric, for example, they are all expressed in percentages.

Because the higher the processor busy parameter value, the memory usage rate and the network busy parameter value are, the weaker the state performance of the storage node is, the initial performance score may be converted into a performance score after the initial performance score is obtained. Specifically, a reciprocal of the initial performance score may be used as a performance score, or a value minus the initial performance score from the preset value may be used as a performance score.

In practice, the performance score may be calculated according to at least two of processor busy parameter values, the memory usage rate and the network busy parameter value, specifically, the performance score may be calculated according to the processor busy parameter value and the memory usage rate, because both the processor busy parameter value and the memory usage rate reflect a hardware performance state of the storage node, so it may be used as an embodiment to calculate the performance score.

Certainly, in some embodiments, performance scores may be calculated according to the processor busy parameter value, the memory usage rate and the network busy parameter value, to judge the state performance of storage nodes more comprehensively and accurately.

In some embodiments, further, the initial performance score of each storage node may be determined based on at least two of the processor busy parameter value, the memory usage rate and the network busy parameter value corresponding to each storage node, and respective weights of each parameter value.

In this embodiment, different weights may be set for different parameter values, or the same weights may be set for different parameter values. When calculating the performance score according to the processor busy parameter value, the memory usage rate and the network busy parameter value, the processor busy parameter value and the network busy parameter value may be set with the same weight, and the memory usage rate may be set with another weight.

When calculating the initial performance score, each parameter value may be weighted and summed according to the weights of each parameter value (at least two of the processor busy parameter value, the memory usage rate and the network busy parameter value), to obtain the initial performance score.

Next, the process of determining the first storage node and the second storage node will be explained by an example.

Taking the state parameters including a processor busy parameter value, a memory usage rate and a network busy parameter value as an example, combined with the communication environment shown in FIG. 1, how to get the performance score of storage nodes is explained. Assuming that a target volume is divided into four parts and the storage system includes four storage nodes, a result of one-time detection of states of storage nodes are shown in Table 1:

TABLE 1

State Parameter Table of Storage Nodes

| Storage node | Processor busy parameter value | Memory usage rate | Network busy parameter value |
|---|---|---|---|
| Node 1 | 70% | 60% | 75% |
| Node 2 | 20% | 30% | 25% |
| Node 3 | 50% | 50% | 50% |
| Node 4 | 60% | 40% | 50% |

Assuming that the weights corresponding to each parameter value are the same, the average score of each storage node is calculated according to the processor busy parameter value, the memory usage rate and the network busy parameter value, and a formula is as follows: $y_i = (100 \times X_{i,1} + 100 \times X_{i,2} + 100 \times X_{i,3})/3$; wherein $y_i$ represents an initial performance score of storage node i, and $x_{i,1}$, $x_{i,2}$ and $x_{i,3}$ respectively represent three state parameters of storage node i (processor busy parameter value, memory usage rate and network busy parameter value);

In this way, the performance score of each storage node in Table 1 may be calculated, specifically: the performance score of Node 1 is 35, the performance score of Node 2 is 75, the performance score of Node 3 is 50, and the performance score of Node 4 is 50.

Then, taking 60 as a preset score threshold, nodes with score 60 or more are still the optimal storage nodes, and nodes with less than score 60 are considered to be replaced by other nodes with score 60 or more.

As a result, the only node with a score greater than or equal to 60 is Node 2, so the optimal node of L2 is still Node 2, while the nodes with a score less than 60 are Node 1, Node 3 and Node 4, and the lowest score is 35 of Node 1, so the optimal node of L1 is adjusted from Node 1 to Node 2 with the highest score, and the corresponding optimal path device will also be adjusted to sdc on the server side. The second lowest score is Node 3, which may still be the optimal node of L3.

Accordingly, after adjusting the mapping relationship in Table 1 and sending the adjusted mapping relationship to the server, the optimal storage nodes and optimal path devices corresponding to a plurality of segments are shown in Table 2:

TABLE 2

Optimal storage nodes and optimal path devices corresponding to a plurality of segments.

| Segment number | Optimal storage node | Optimal path device |
|---|---|---|
| L1 | Node 2 | sdc |
| L2 | Node 2 | sdc |
| L3 | Node 3 | sdd |
| L4 | Node 4 | sde |

It may be seen that the optimal storage node corresponding to L1 is adjusted from Node 1 to Node 2, and then the optimal path device is adjusted from sdb to sdc.

As mentioned above, the state parameters may also include at least one of the processor busy parameter value, the memory usage rate and the network busy parameter value, wherein a plurality of state parameters may be measured in the same measurement mode to facilitate calculation, for example, using a percentage for measurement. At least one of a processor busy state, a memory usage state and a network busy state of the storage nodes may be detected when the states of the plurality of storage nodes are detected.

Specifically, when detecting the processor busy state of a storage node, a duration that a processor of the storage node is in a target busy state in a unit time may be detected, and the processor busy parameter value of the storage node may be obtained.

The processor may refer to a CPU (Central Processing Unit) of the storage node, and the value of the busy parameter may be expressed as a percentage, with a minimum of 0% and a maximum of 100%. For example, 45% means that the CPU is busy for 45% of the time in a unit time.

When detecting the memory usage state of a storage node, an average capacity of a memory used on the storage node in a unit time may be detected, and the memory usage rate may be obtained.

The memory usage rate is also expressed as a percentage, ranging from 0% to 100%. For example, if 30% of the memory capacity is used, that is, 30%, it means that 30% of the memory is used on average in a unit time.

When detecting the network busy state of a storage node, a ratio between a data flow on the storage node and a network bandwidth in unit time may be detected, and the network busy parameter value is obtained.

The network busy parameter value is also expressed as a percentage, with a minimum of 0% and a maximum of 100%. For example, 15% means that the ratio of data traffic per unit time to a network bandwidth is 15%.

The unit time may be an interval of a periodic detection of storage nodes, or it may be other time. Generally speaking, in the periodic detection of storage nodes, it is necessary to monitor the above performance indicators of storage nodes in the unit time within this period.

II. According to the path switching information sent by the host, the mapping relationship may be adjusted as follows.

In one embodiment, when receiving the path switching information sent by the host, it means that the host determines that the IO request on a certain path device needs to be switched to other path devices according to the efficiency of processing requests of a plurality of path devices. At this time, on the one hand, the host may transfer the target IO request to another path device based on the path switching information. While the storage system will process the target IO request by the storage node corresponding to the path device to which the target IO request is transferred based on the transferring (because the target IO request is transferred to another path device, the corresponding storage node needs to be adjusted to respond to the target IO request). IO requests not included in the path switching information may still be processed according to the original mapping relationship.

In specific implementation, the first path device and at least one second path device may be determined based on the path switching information; And when the storage node corresponding to the first path device finishes processing an IO request ranked first, processing at least one of the target IO requests by the storage node corresponding to the second path device.

At least one target IO request in the first path device is to be transferred to the second path device.

In this embodiment, the target IO request is an IO request in which the first path device is transferred to the second path device, wherein, since one storage node may be the optimal storage node for a plurality of segments, the target IO request may correspond to one or more segments.

The first path device to be switched is a path device with low efficiency of processing requests, while the second path device is a path device with high efficiency of processing requests, wherein at least one target IO request is part of the IO requests to be processed in the first path device. If the IO requests are generally ranked in chronological order, the IO requests ranked behind are those with later time. Wherein, because the target IO request is part of the IO request in the first path device, generally speaking, one path device corresponds to one storage node, and one storage node may be the optimal storage node of the plurality of segments, then the first path device may contain IO requests of a plurality of segments and a plurality of IO requests of the same segment; In this case, part of the IO requests of the same segment stored in the first path device need to remain in the first path device for processing, while the rest of the IO requests need to be transferred to the second path device.

In order to ensure that every IO request is processed, after the host transfers part of IO requests (target IO requests) from the first path device to the second path device, on the storage system side, the storage node corresponding to the first path device in the storage system may process the IO requests sent by the first path device, then adjust the mapping relationship, and then process the target IO requests by the storage node corresponding to the second path device.

After the host transfers the target IO requests in the first path device to the second path device, it may generate path switching information to inform the storage system to change the processing paths of these target IO requests, and the storage system will change the optimal storage nodes of the segments targeted by the target IO requests accordingly.

The path switching information may include an identification of the first path device, an identification of the second path device, an identification of the segment targeted by the target IO request, and an identification of the target IO request.

For example, taking FIG. 1 as an example, suppose the host determines that the target IO request in the path device sdc needs to be transferred to sdb, and the path switching information includes the identification of the target IO request, the identification of the storage node Node 2 corresponding to the path device sdc, and the identification of the storage node Node 1 corresponding to the path device sdb. According to the path switching information, the storage system will first process other IO requests by the storage node Node 2, and then process the target IO request by the storage node Node 1.

In some embodiments, when the storage system receives the path switching information, the mapping relationship may be immediately adjusted, or it may not be adjusted at present. In some embodiments, when the mapping relationship is adjusted immediately, the segment targeted by the target IO request may be mapped from the storage node corresponding to the first path device to the storage node corresponding to the second path device based on the path switching information.

In this embodiment, the mapping relationship may be adjusted immediately every time a path switching message is received, so that the optimal storage node and the optimal path device determined by the storage system may adapt to the state performance of the path device on the host in time.

During the adjustment based on the path switching information, because one storage node may be the optimal storage node of the plurality of segments, and the transferred target IO request is generally targeted for a specific segment, the optimal storage node of this segment may be switched to the storage node corresponding to the second path device according to the segment targeted by the target IO request.

For example, if the host determines that the target IO request in the path device sdc needs to be transferred to sdb, the storage system may switch the storage node mapped by the target segment from Node 2 to Node 1.

Certainly, in some other embodiments, the storage system may keep the mapping relationship unchanged when it receives a path switching information, that is, it does not adjust the mapping relationship first, and then adjusts the mapping relationship if it frequently receives the path switching information of a storage node.

In specific implementation, a switching number of the received path switching information for the first path device and the second path device targeted by each path switching information may be determined; And the mapping relationship is adjusted based on the switching number and the storage node corresponding to the second path device targeted by each path switching information.

When a certain path device is frequently switched, it indicates that the performance of the path device on the host in processing IO requests corresponding to the storage node is seriously blocked, and the storage node needs to be adjusted, that is, the optimal storage node of the target segment is switched to the storage node corresponding to another optimal path device determined by the host. For the host, all subsequent IO requests for the target segment will be mapped to the switched optimal path device, so that the IO requests may be processed on the switched optimal storage node by the optimal path device.

The target segment refers to the segment for which the target IO request is targeted.

In other examples, because a storage node may be the optimal storage node for the plurality of segments, correspondingly, a path device may also be the optimal path device for the plurality of segments, and when switching path devices, the transferred target IO requests may be targeted for different segments, and the transferred target IO requests are different every time the path is switched.

Accordingly, when the mapping relationship is adjusted based on the switching number and the second path device targeted by each path switching information, the adjustment may be made when the switching number exceeds a preset number, such as three. During adjustment, the second path device for each path switch and the segment for each transferred target IO request may be determined, and the path device that receives the transferred IO request the most times is taken as the second path device, and the segment with the transferred IO request the most is taken as the target segment, so that the storage node mapped by the target segment may be adjusted to map with the storage node corresponding to the second path device.

Illustratively, assuming that a first path device is sdc, there are 10 pieces of path switching information for sdc, which exceeds a preset number of 9, wherein 7 pieces of path switching information show that the switched second path device is sdb, and 3 pieces of path switching information show that the switched second path device is sdd, and the segments targeted by the transferred target IO requests are L1, L5 and L9 respectively, wherein L1 has the largest number of target IO requests. It may be indicated that the IO request of L1 segment is seriously overstocked, then the optimal storage node of L1 may be adjusted from Node 2 to Node 1, and the incoming IO request of L1 will be sent to the second path device sdb, which will perform a reading and writing operation on the storage node Node 1.

By adopting the technical solution of this embodiment, because the mapping relationship may be appropriately adjusted based on the number of paths switching information, the second path device targeted by each path switching information and the transferred target IO request. In this way, on the one hand, the problems of frequent dispatching changes of IO requests caused by frequent adjustment of the mapping relationship can be avoided, which may lead to missed processing and low efficiency. On the other hand, after comprehensively monitoring and considering the IO processing efficiency of the path device and the storage node, the mapping relationship may be adjusted, thus improving the accuracy of the mapping relationship adjustment, and making the adjusted mapping relationship more suitable for the performance of the path device of the host and the performance of the storage node.

Based on the same inventive concept, the present disclosure also provides an IO request processing method for multi-path storage, which may be applied to a host, and the host relates to a storage system, and the storage system includes a plurality of storage nodes. Combined with the communication environment of FIG. 1, the second embodiment is introduced.

Figure 3:
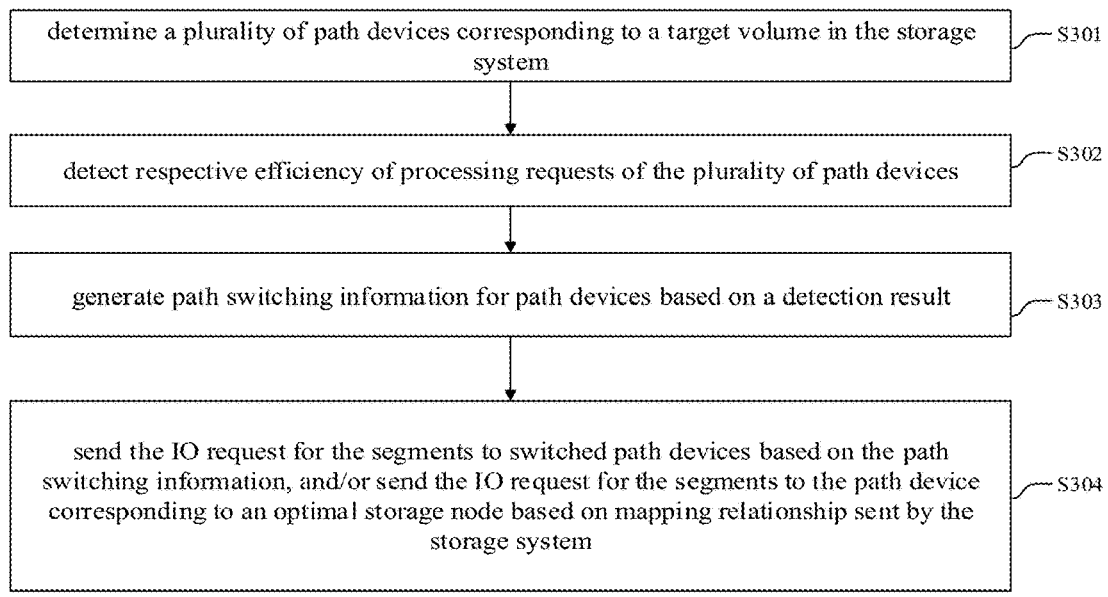
FIG. 3 schematically shows a flowchart of steps of an IO request processing method for multi-path storage according to a second embodiment of the present disclosure.

Referring to FIG. 3, it shows a schematic flow chart of the steps of a multi-path storage IO request processing method according to the second embodiment, as shown in FIG. 3, which specifically includes the following steps.

Step S301: determining a plurality of path devices corresponding to a target volume in the storage system;

wherein the target volume is divided into a plurality of segments and stored on the plurality of storage nodes, and the plurality of storage nodes respectively correspond to the plurality of path devices.

In this embodiment, the target volume is a volume in the storage system, in which the target volume is mapped to the host in advance, so that the path devices corresponding to the target volume may be obtained, and the number of path devices may correspond to the number of storage nodes in the storage system. For example, if the storage system has four storage nodes, there are also four path devices on the host, and one path device may correspond to a set of IO request processing links, and one volume may correspond to a plurality of links, so that the host may pair the same target through multi-path links.

Generally, there are a plurality of volumes in the storage system, so each volume is mapped to a plurality of corresponding path devices on the host, and the plurality of path devices mapped by different volumes will be different. For the host, after obtaining the multi-path devices mapped by the target volume, the multi-path devices may be aggregated into a multi-path device of the target volume, to independently dispatch and manage the IO requests of each volume.

In this embodiment, the host may be configured with a multi-path software, which includes a user mode and a kernel mode. The user mode is responsible for multi-path management, and the kernel mode is responsible for IO routing, that is, selecting the corresponding path device for IO requests.

In some embodiments, when the multi-path software starts running, that is, when the storage system starts working, the host may receive the mapping relationship sent by the storage system for the target volume; Wherein, the mapping relationship is used to identify the optimal storage node corresponding to the segment.

The multi-path software on the host may obtain the received mapping relationship. First, the mapping relationship includes the optimal storage node corresponding to each segment, and then the optimal path device may be determined on the host side based on the optimal storage node, to obtain the processing path of the IO request of each segment. For example, if the starting position of an IO request is 50M and the size is 512 KB, then according to the division of the target volume, the IO request is for L2, and the optimal device for L2 is sdc, then the host will allocate the IO request to sdc and wait for processing.

Step S302: detecting respective efficiency of processing requests of the plurality of path devices.

In this embodiment, the host may periodically detect the efficiency of processing requests of the plurality of path devices of the target volume or detect it in real time. A periodic detection may mean that the efficiency of processing requests of the path equipment is detected once every certain time, and real-time detection may mean that the efficiency of processing requests of the path equipment is continuously detected in real time. Generally speaking, a periodic detection may be selected.

The efficiency of processing requests of the path device may indicate the efficiency of the path device in processing IO requests, which may be expressed by the number of IO requests processed by the path device per unit time or the average time spent for processing each IO request.

Step S303: generating path switching information for path devices based on a detection result; The path switching information is used to indicate the switching of the path device that process the IO request of the segments.

In this embodiment, after detecting the respective request processing efficiencies of the plurality of path devices, the obtained detection results may reflect the efficiency of each path device in processing IO requests, so that a path device with low processing efficiency (hereinafter referred to as the first path device) and a path device with high processing efficiency (hereinafter referred to as the second path device) may be obtained, and the target IO request in the first path device may be transferred to another second path device.

The target IO request to be transferred may be part of the IO request ranked behind in the first path device. In practice, the host may generate path switching information according to the identification of the first path device and the identification of the second path device, and the path switching information may be sent to the storage system, so that the storage system may adjust the mapping relationship based on the path switching information.

The path switching information may indicate to transfer the target IO request from a located path device (a first path device) to another path device (a second path device), wherein there may be a plurality of first path devices and a plurality of second path devices.

Specifically, a first path device may correspond to one or more second path devices, that is, a target IO request in a first path device may be transferred to one or more second path devices.

Step S304: sending the IO request for the segments to switched path devices based on the path switching information, and/or sending the IO request for the segments to the path device corresponding to an optimal storage node based on mapping relationship sent by the storage system;

The optimal storage node is the storage node corresponding to the segment in the mapping relationship.

The host may send a plurality of IO requests to their corresponding path devices based on the mapping relationship sent by the storage system, and then, it may detect the efficiency of processing requests of each path device, and transfer at least one target IO request on one path device to another or a plurality of other path devices according to the detection result, to achieve fine-tuning the mapping relationship on the host side according to the efficiency of processing requests of the path devices.

When transferring the target IO requests from the first path device to one or more second path devices, these target IO requests may be ranked after the pending IO requests in the second path device, that is, the second path device process the IO requests originally mapped to the second path device first, and then process the transferred target IO requests.

Generally speaking, a simultaneous occurrence of the adjusted mapping relationship and path switching information should be avoided. In this way, the host may dispatch an IO request either according to the adjusted mapping relationship informed by the storage system or according to the path switching information.

Specifically, when the host obtains the adjusted mapping relationship sent by the storage system, it may dispatch IO requests according to the adjusted mapping relationship. Then, if the host determines that the IO requests in the first path device need to be transferred after detecting the efficiency of processing requests of the path device, it will generate path switching information. According to the path switching information, the host will dispatch at least one target IO request in the first path device to the second path device, and send the path switching information to the storage system for storage.

Because the host may determine to switch the path of the target IO request according to the efficiency of processing requests of a plurality of path devices, the IO request in the path device with low efficiency of processing requests may be dispatched to the path device with high efficiency of processing requests in time, so that the dispatching of the IO request may be dynamically adapted to the efficiency of processing requests of the path device on the host to improve the processing efficiency of the IO request.

Moreover, on the storage system side, the mapping relationship is dynamically adjusted based on the state performance of each storage node, so that the dispatching strategy of IO requests will be dynamically updated for the host, so that the dispatching of IO requests not only matches the performance of storage nodes, but also matches the efficiency of processing requests of path devices on the host, so that each IO request may be dispatched to the optimal storage node and the optimal path device.

In one embodiment, the path switching information may be sent to the storage system, so that the storage system may adjust the mapping relationship based on the path switching information and/or the respective state parameters of a plurality of storage nodes detected in each cycle, wherein the adjustment process may refer to the corresponding description of the first embodiment.

The process of establishing a multi-path storage link between the host and the storage system may be as follows:
establish a multi-path iSCSI link between the host and the storage system through a command line;
or, establish a multi-path FC link between the host and the storage system through a FC card; wherein, the multi-path link is a link for the target volume, and one link corresponds to one path device.

In detail, a creation of a type of link may be determined according to the configuration information pre-configured by a user. When a preset path link type is an iSCSI link, the created host must contain IQN (ISCSI Qualified Name, a qualified name of an Internet small computer system interface) information of the current server; when the preset path link type is a FC (Fiber Channel) link, the created host must contain WWPN (World Wide Port Name) information of the current server.

In one embodiment, when generating the path switching information, it may be generated based on the first path device, the second path device, and the corresponding target IO request to be transferred.

In specific implementation, the first path device and at least one second path device may be determined based on the detection result; And the path switching information based on the first path device and the second path device and the target segment corresponding to the target IO request are generated, to indicate the transfer of the target IO request from the first path device to at least one second path device.

At least one target IO request in the first path device is to be transferred to the second path device.

In this embodiment, the path device with low efficiency of processing requests may be determined as the first path device, and the path device with high efficiency of processing requests may be determined as the second path device. In practice, at least one target IO request ranked in the first path device may be transferred to at least one second path device.

In an example, each path device may be sorted according to the efficiency of processing requests, specifically, it may be sorted according to the order from high to low efficiency of processing requests, so that the path device ranked in front may be used as the second path device, and the path device ranked behind may be used as the first path device.

In some embodiments, when detecting the respective IO efficiency of processing requests of the plurality of path devices, the number of IO requests processed by the path devices in a unit time may be detected, so that the average time taken by each path device to process each IO request may be calculated, and thus the waiting time of each IO request to be processed in each path device may be obtained.

Specifically, the number of IO requests processed by each path device in a unit time and the number of IO requests currently to be processed may be detected at each detection. Therefore, according to the number of IO requests processed in a unit time, the average time taken by the path device to process each IO request may be obtained; Based on the average duration, the maximum waiting time of the currently pending IO request may be determined, that is, the waiting time of the last IO request.

Accordingly, when determining the first path device and at least one second path device based on the result of performance detection, the waiting time of each IO request to be processed in the path device may be determined based on the number of IO requests processed by each path device in a unit time and the number of IO requests to be processed. And determine a first path device and at least one second path device based on the waiting time.

For each path device, the waiting time of the last IO request in the path device may be regarded as the maximum waiting time, and then based on the order of the maximum waiting time from high to low, all the path devices are sorted, and the path device ranked in front has the shortest maximum waiting time, which indicates that if a new IO request comes from the path device, it will be processed faster than other path devices.

Therefore, a path device with a long waiting time, such as the largest path device, may be determined as the first path device, and a path device with a short waiting time, such as the smallest path device, may be determined as the second path device. Certainly, this is only an exemplary explanation. In practice, a plurality of second path devices may be determined, and in some cases, a plurality of first path devices may also be determined.

It should be noted that in the first embodiment, in some cases, the segmented mirror images are stored in the plurality of storage nodes, and when the mapping relationship is adjusted, the mapping relationship may be switched among the plurality of storage nodes stored in the segmented mirror images. For the host, the path devices and storage nodes may correspond to each other one-to-one, so when switching the path devices, this restriction is not required, because the host is the secondary dispatching for IO requests.

In some examples, the path device with the longest waiting time may be determined as the first path device;
The path device with the shortest waiting time is determined as the second path device.

The path device with the longest waiting time may be the device with the longest waiting time corresponding to the last IO request to be processed, and the path device with the shortest waiting time may be the device with the shortest waiting time corresponding to the last IO request to be processed.

For example, taking FIG. 1 as an example, suppose that the target volume is mapped to a host with four path devices, and the detection results of the four path devices are shown in the following table 3:

TABLE 3

Test Results of Four Path Devices

| Device | Number of IO requests to be processed | Number of IO requests processed per unit time |
| --- | --- | --- |
| sdb | 25 | 6 |
| sdc | 15 | 2 |
| sdd | 25 | 3 |
| sde | 7 | 4 |

The determination of the waiting time corresponding to each path device may be as follows.

A waiting time for the last IO of sdb is (25-1)/6=4 seconds. Similarly, a waiting time for the last IO of sdc is (15-1)/2=7 seconds, a waiting time for the last IO of sdd is (25-1)/3=8 seconds, a waiting time for the last IO of sde is (7-1)/4=1.5 seconds, respectively. It may be seen that the last IO of the device sdd has the longest waiting time, while the last IO of the device sde has the shortest waiting time.

Then sde may be used as the second path device and sdd may be used as the first path device, that is, at least one target IO request in the device sdd needs to be transferred to the device sde. Certainly, the above is only an example.

In some embodiments, when the plurality of IO requests are sent based on the path switching information, the target IO request to be processed in the first path device may be transferred to at least one second path device, so that the second path device may process the target IO request.

One or more target IO requests to be processed and ranked in the first path device may be transferred to one or more second path devices. If there are a plurality of second path devices, one second path device may receive the transferred one or more target IO requests.

For example, as shown in Table 3, if a target IO request is dispatched to a second path device, it may be considered that the last IO request of the device sdd is dispatched to the device sde for the second time. If the last IO request of the device sdd is dispatched to the device sde for the second time, the waiting time of the new last IO request of the device sdd is (24-1)/3=7.66 seconds, and the new last IO of the device sde is (8-1)/4=1.75 seconds. It may be seen that after the second dispatching, the waiting time of the last IO request on the device sdd is still longer than that of the device sde, so it may be dispatched. Therefore, it may be determined that the first path device is the device sdd and the second path device is the device sde.

After path switching, the following table 4 can be referred:

TABLE 4

IO allocation quantity of each path device after switching path devices

| Device | Number of IO requests to be processed | Number of IO requests processed per unit time |
| --- | --- | --- |
| sdb | 25 | 6 |
| sdc | 15 | 2 |
| sdd | 24 | 3 |
| sde | 8 | 4 |

In other examples, a plurality of target 10 requests in a first path device may be mapped to a second path device, and since the plurality of target IO requests need to be transferred, it may be determined whether to transfer these the plurality of target IO requests to one path device or the plurality of path devices. Specifically, it may be determined whether a waiting time exceeds a waiting time in the first path device when all the target IO requests are transferred to one path device. If the waiting time exceeds the waiting time in the first path device, one or more path devices may be determined, to map the plurality of target IO requests to the plurality of second path devices. After the transferring, the waiting time of each target IO request is shortened accordingly.

In specific implementation, when the plurality of target IO requests are included, a first maximum waiting time corresponding to the IO requests to be processed in the second path device and a second maximum waiting time corresponding to the IO requests to be processed in the first path device may be determined after all the target IO requests in the first path device are mapped to a second path device.

If the first waiting time is not longer than the second waiting time, all the plurality of target IO requests are mapped to a second path device.

If the first maximum waiting time is greater than the second waiting time, at least one second path device is determined from a plurality of third path devices; wherein, the third path device is a device whose waiting time is shorter than that of the first path device.

In this embodiment, after all the target IO requests in the first path device are mapped to a second path device, the second path device increases IO requests accordingly, and the waiting time of the last target IO request on the second path device may be recalculated according to the detected efficiency of processing requests of the second path device. If the waiting time exceeds the waiting time in the first path device, then one path device with higher efficiency of processing requests may be determined as the second path device, that is, one path device with higher efficiency of processing requests is selected as the second path device, to dispatch the plurality of target IO requests to the plurality of second path devices for the second time.

Illustratively, as shown in Table 3, if four target IO requests in the path device sdd are transferred to the device sdc, the waiting time of the last target IO request in the device sdc is 9 seconds, which is greater than that in the sdd. Then the sdb may be determined as another second path device, and then four target IO requests may be mapped into the path device sdb and the path device sdc respectively.

In this embodiment, when any path device with higher efficiency of processing requests than the first path device is used as the second path device, that is, the second path devices are randomly assigned, and it is only necessary to determine a second path device with higher efficiency of processing requests when it is determined that the second path devices can receive all the transferred target IO requests, and the waiting time of the target IO requests has not been shortened. In this way, at least one target IO request can be transferred to the same second path device as much as possible, and complexity of the secondary dispatching can be reduced.

In some embodiments, in the case of including a plurality of second path devices and a plurality of target IO requests, the plurality of target IO requests need to be transferred to the plurality of second path devices, wherein the plurality of target IO requests may be transferred to the plurality of second path devices respectively; wherein a second path device is transferred with one or more target IO requests.

In specific implementation, a number of target IO requests transferred by each second path device may be determined based on respective efficiencies of processing requests of a plurality of second path devices. Then, according to the number of target IO requests transferred by each second path device, a plurality of target IO requests are transferred to the plurality of second path devices respectively.

The efficiency of processing requests may refer to a number of IO requests that may be processed per unit time. The larger the number, the higher the efficiency of processing requests will be, and more IO requests will be allocated. For example, as shown in Table 3, in terms of efficiency of processing requests, the device sdb has the highest efficiency of processing requests, so more IO requests may be allocated to the device sdb. It should be noted that the number of IO requests allocated to each second path device needs to meet the condition that the waiting time does not exceed the waiting time in the first path device.

The efficiency of processing requests may also refer to the waiting time of each IO request in the path device, so the number of target IO requests transferred to the second path device may be determined according to the waiting time. Specifically, the path device with shorter waiting time may be transferred with more target IO requests.

In this embodiment, if the plurality of path devices with higher request efficiency than the first path device is determined as the second path device, the target IO requests in the first path device need to be transferred to the plurality of second path devices. In this case, more target IO requests may be transferred to the second path device with shorter waiting time, and fewer target IO requests may be transferred to the second path device with the longest waiting time.

Specifically, when dispatching, the number of target IO requests transferred to each second path device may be determined based on the waiting time with a relatively small difference of the target IO requests transferred to each second path device.

Illustratively, taking Table 3 as an example, it is assumed that a waiting time of the path device sdd exceeds 8 seconds, wherein 9 target IO requests in the path device sdd are transferred to other devices sdb and sde, and a longest waiting time of the device sdd is 5 seconds after the transfer, wherein a small number of target IO requests may be transferred to the device sdb because the longest waiting time of the device sdb is 4 seconds. For example, 3 target IO requests may be transferred to the sdb, and after the transfer, the longest waiting time of sdb is 4.5 seconds, the remaining 6 target IO requests are transferred to sde. After the transfer, the longest waiting time of sdb is 3 seconds. That is to say, after the transferring, there is a relatively small difference in waiting time among sde, sdb and sdd.

Or, in order to further narrow the difference, one target IO request can be transferred to sdb. After the transfer, the longest waiting time of sdb is 4.1 seconds, and the remaining 8 target IO requests are transferred to sde. After the transfer, the longest waiting time of sdb is 3.5 seconds. In this way, the difference of waiting time among sde, sdb and sdd is smaller.

In this way, the waiting time of each IO request may be shortened as a whole, so that a progress of each path device in processing IO requests may be kept consistent as much as possible, thus improving a balance of reading and writing each segment in the target volume.

In some embodiments, when switching path devices and transferring IO requests based on the detection results, that is, when secondary dispatching, if it is determined that a target IO request in the first path device needs to be dispatched for the second time, the last target IO request in the first path device may be transferred to the second path device. For example, the last target IO request in the first path device may be transferred to a second path device with the shortest waiting time.

If it is determined that a plurality of target IO requests in the first path device need to be dispatched for the second time, a plurality of target IO requests ranked behind in the first path device may be transferred to at least one second path device.

A process of transferring the plurality of target IO requests to at least one second path device is to determine the number of target IO requests transferred to the second path device according to the longest waiting time of each second path device, and transfer the plurality of target IO requests respectively to the plurality of second path devices according to the number.

In some embodiments, it is necessary to determine a number of target IO requests to be transferred in the first path device to be switched, which may be one or multiple. Specifically, a difference between a waiting time (that is, a longest waiting time) corresponding to a last IO request in the first path device and a waiting time that is, a longest waiting time) corresponding to a last IO request in the second path device may be determined according to the detection result, and according to the difference, the number of target IO requests can be determined to ensure that the wait time is reduced for each target IO request that is transferred.

In concrete implementation, the longest waiting time corresponding to the first path device and an average waiting time of the longest waiting time corresponding to the second path device may be determined; a target number of IO requests to be transferred based on the average waiting time may be determined; the target number of IO requests ranked behind in the first path device may be determined as the target IO requests to be transferred.

In this embodiment, if there is only one second path device, for example, the second path device is the path device with the shortest waiting time, it is necessary to determine which IO requests in the first path device are dispatched to the second path device. Wherein, in the case that the longest waiting time corresponding to the first path device and the average waiting time of the longest waiting time corresponding to the second path device may represent balanced efficiency, an expected optimal waiting time for the two path devices to finish processing IO requests is that the two path devices have finished processing all IO requests in a relatively small time.

Illustratively, a device sdd is a first path device and a device sde is a second path device, and if an average waiting time of the longest waiting time is 4.75 seconds, it is better for both the first path device and the second path device to finish processing all IO requests within 4.75 seconds. Based on this constraint, a number of IO requests transferred from the first path device to the second path device may be calculated. Specifically, If a number of IO requests processed by the first path device in 4.75 seconds is 14, and a number of IO requests processed by the second path device in 4.75 seconds is 19, then 12 or 11 IO requests ranked behind in the first path device may be transferred to the second path device. In this way, after the transfer, both path devices may process the IO requests in about 4.75 seconds, thus realizing that each path device may process the IO requests in a time with relatively small difference, and improving load balancing for I/O request.

To sum up, the second embodiment gives the following path switching ways.

In the first way, a path device with the longest waiting time may be determined as the first path device and a path device with the shortest waiting time may be determined as the second path device. In this case, the last target IO request in the first path device may be transferred to the second path device, or the target number of IO requests in the first path device may be transferred to the second path device according to the average waiting time of the longest waiting time of the first path device and the longest waiting time of the second path device, to achieve a balanced waiting time between the two devices.

In the second way, a plurality of path devices with relatively long waiting time may be determined as first path devices and a plurality of path devices with relatively short waiting time may be determined as second path devices. In this case, the plurality of IO requests of the first path device may be transferred to the plurality of second path devices respectively, and a number of IO requests which are transferred to each second path device may be determined by the efficiency of processing requests of the second path devices. Alternatively, a longest waiting time when the plurality of target IO requests are all transferred to any one of the second path devices may be calculated first, and based on a size relationship between the longest waiting time and an original longest waiting time of the first path device, whether to add a second path device may be determined.

In the third way, a path device with a longest waiting time or with a relatively long waiting time may be determined as a first path device, so there are a plurality of first path devices. Accordingly, a path device with a shortest waiting time or with a relatively short waiting time may be determined as a second path device. Wherein, the IO request of the first path device with the longest waiting time may be transferred to the second path device with the shortest waiting time, and the IO request of the first path device with the relatively long waiting time may be transferred to the second path device with the relatively short waiting time.

Next, by a complete example, referring to FIG. 1, the IO request processing method for multi-path storage in the embodiment of the present disclosure will be illustratively explained, wherein a host is taken as a server.

S1, configure a target volume and configure a multi-path link between a storage system and the host.

(1) Create and map a volume, log in to the storage system, create a volume by a command or a visual interface, and map the volume to a server to obtain a plurality of path devices.

(2) Establish a link, log in to the server, and establish a link between the server and the storage system. Generally speaking, a plurality of links should be established so that the volumes mapped to the server correspond to a plurality of devices (each volume corresponds to one device through a link).

For an iSCSI link, the link between the server and the storage system is established by a command line.

For a FC link, the link between server and storage system is established by a FC card.

(3) Discover a device.

Log in to the server, and by typing a command, a plurality of path devices may be created on the host. If there are four links, then different volumes correspond to four different devices, for example, volume 1 corresponds to sdb, sdc, sdd and sde, and volume 2 corresponds to sdf, sdg, sdh and sdi.

(4) Aggregation of multi-path.

Log in to the server, and start a multi-path software by a command to aggregate devices with the same volume identification into a multi-path device, for example, multi-path device −0, corresponding to volume 1.

S2, the storage system determines a mapping relationship between a plurality of segments of the target volume and a plurality of storage nodes; As described above, the mapping relationship is used to identify an optimal storage node to which the segment is mapped in a plurality of storage nodes, that is, to identify a processing path of the IO request for the segment, wherein the plurality of storage nodes respectively correspond to a plurality of path devices to which the target volume is mapped on the host.

S3, the storage system sends the mapping relationship to the server.

S4, based on the mapping relationship, the server sends a plurality of IO requests to corresponding path devices according to the segments targeted by the IO requests, so that the path devices may process the corresponding IO requests.

S5, the storage system detects states of the plurality of storage nodes according to a first preset time interval, and the server detects the efficiency of processing requests of the plurality of path devices according to a second preset time interval; If the first preset time interval is less than the second preset interval, a frequency of the storage system to adjust the mapping relationship will be higher than that of the server to switch the path devices.

S6, after each detection, the storage system adjusts the mapping relationship based on detected state parameters of the plurality of storage nodes, and sends the adjusted mapping relationship to the server, so that the server sends the plurality of IO requests to the path device corresponding to an optimal storage device of the segment according to the adjusted mapping relationship.

S6, the server determines a first path device to be switched, at least one second path device and at least one target IO request to be transferred in the first path device based on a detection result of the efficiency of processing requests.

S7, the server transfers at least one target IO request to be transferred in the first path device to at least one second path device, and generates path switching information and sends it to the storage system. For example, a last IO request in the first path device is transferred to the second path device with a shortest waiting time.

S8, after receiving the path switching information, the storage system processes the IO requests ranked before the target IO requests by the storage node corresponding to the first path device, and then process the target IO requests by the storage node corresponding to the second path device.

S9, the storage system may adjust the mapping relationship based on the path switching information. Specifically, for the storage node corresponding to the first path device, the segment mapped by the storage node may be adjusted to map the segment with the storage node corresponding to the second path device, that is, the storage node corresponding to the second path device is selected as the optimal storage node for the segment.

Totally, with the IO request processing method of multi-path storage disclosed in the present disclosure, the storage system may adjust the mapping relationship based on the states of its the plurality of storage nodes. The host may always send IO requests to the path devices according to the mapping relationship sent by the storage system, and in the process of sending IO requests to the path devices by the host, the host may also continue to detect the efficiency of processing requests of the path devices, to timely adjust the optimal path devices targeted by some IO requests and realize the secondary dispatching of the IO requests to be processed on one of the path devices, thus balancing the load of the path devices and improving the processing efficiency. In this way, both the host side and the storage system side have made contributions to improving the efficiency of IO request processing.

Based on the same inventive concept, the present disclosure also provides a processing system, as shown in FIG. 1, including a storage system and a host; wherein:
a storage system, configured to execute the IO request processing method of multi-path storage in the first embodiment;
a host, configured to execute the IO request processing method for multi-path storage in the second embodiment.

Specifically, the system also includes a switch by which the storage system communicates with the host. That is to say, when the storage system sends a mapping relationship to the host, it may send the mapping relationship to the host by the switch, and when the host sends a path switching information to the storage system, it may also send the path switching information to the storage system by the switch.

The IO request of the path device may be sent to the corresponding storage node by the switch, and then the data reading operation or data writing operation may be performed on the storage node.

Because the storage system may detect states of the plurality of storage nodes and the host may also detect efficiency of processing requests of the plurality of path devices, in practice, a time interval of the storage system detecting the states of the plurality of storage nodes is different from that of the host detecting the plurality of path devices.

In practice, as mentioned above, the time interval of detecting by the storage system may be shorter than the interval of detecting by the host, that is to say, the host will detect the efficiency of processing requests of the path device at a relatively long interval, to dispatch links of some IO requests for a second time.

Figure 4:
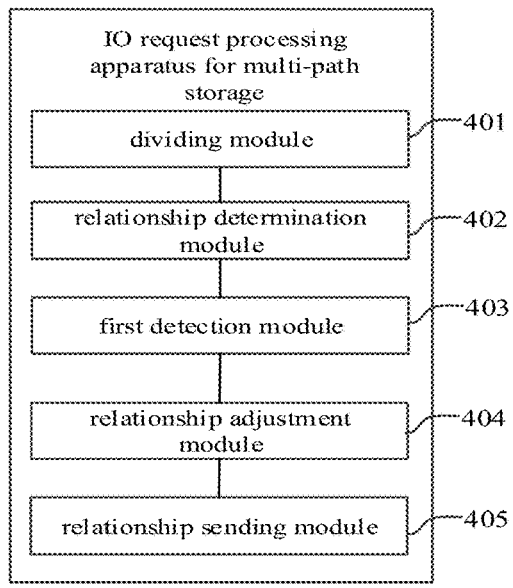
FIG. 4 schematically shows a structural diagram of an IO request processing apparatus for multi-path storage according to a fourth embodiment of the present disclosure.

Based on the same inventive concept, the present disclosure also provides an IO request processing apparatus for multi-path storage, as shown in FIG. 4, which is applied to a storage system, wherein the storage system is connected to a host in communication, and the storage system includes a plurality of storage nodes, and the apparatus includes:
a dividing module 401, configured to divide a target volume to obtain a plurality of segments; wherein the target volume is mapped with a plurality of path devices on the host, and the plurality of path devices correspond to a plurality of storage nodes respectively;
a relationship determination module 402, configured to determine a mapping relationship between the plurality of segments and the plurality of storage nodes; wherein the mapping relationship is used to identify an optimal storage node mapped by the segment in the plurality of storage nodes;
a first detection module 403, configured to detect states of the plurality of storage nodes;
a relationship adjustment module 404, configured to adjust the mapping relationship based on respective detected state parameters of the plurality of storage nodes and/or path switching information sent by the host; wherein, the path switching information is used to indicate switching of the path devices that process the IO request of the segments;
a relationship sending module 405, configured to send the adjusted mapping relationship to the host, so that the host sends the IO request for the segment to the path device corresponding to the optimal storage node based on the adjusted mapping relationship.

In some embodiments, the apparatus further includes:
a path device determination module, configured to determine a first path device and at least one second path device based on the path switching information; wherein at least one target IO request in the first path device is to be transferred to the second path device;
a processing module, configured to when the storage node corresponding to the first path device finishes processing an IO request ranked first, process at least one of the target IO requests by the storage node corresponding to the second path device.

In some embodiments, in the case that the mapping relationship is adjusted based on the path switching information for the path devices sent by the host, adjusting the segment targeted by the target IO request to mapping with the storage node corresponding to the second path device based on the path switching information.

In some embodiments, in the case that the mapping relationship is adjusted based on the path switching information for the path devices sent by the host, determining a switching number of the received path switching information for the first path device and the second path device targeted by each path switching information;
adjusting the mapping relationship based on the switching number and the storage node corresponding to the second path device targeted by each path switching information.

In some embodiments, in the case that the mapping relationship is adjusted based on the respective detected state parameters of the plurality of storage nodes, a relationship adjusting module may determine a first storage node and a second storage node based on respective state parameters of the plurality of storage nodes;
wherein performance of the second storage node in processing IO requests is higher than that of the first storage node.

In some embodiments, a step of determine a first storage node and a second storage node based on respective state parameters of the plurality of storage nodes includes:
determining a target segment to which the first storage node is mapped based on the mapping relationship;
determining the second storage node as the optimal storage node mapped with the target segment.

In some embodiments, a step of determining a first storage node and a second storage node based on respective state parameters of the plurality of storage nodes includes:
determining respective corresponding performance scores of the plurality of storage nodes based on the respective state parameters of the plurality of storage nodes;
determining the first storage node and the second storage node based on a preset score threshold and the respective corresponding performance scores of the plurality of storage nodes.

In some embodiments, the state parameters include at least two of a processor busy parameter value, a memory usage rate and a network busy parameter value; determining respective corresponding performance scores of the plurality of storage nodes based on respective state parameters of the plurality of storage nodes includes:
determining an initial performance score of each storage node based on at least two of the processor busy parameter value, the memory usage rate and the network busy parameter value corresponding to each of the storage nodes;

determining performance scores corresponding to the plurality of storage nodes based on initial performance scores corresponding to the plurality of storage nodes.

In some embodiments, a step of determining an initial performance score of each storage node based on at least two of the processor busy parameter value, the memory usage rate and the network busy parameter value corresponding to each of the storage nodes includes:

determining the initial performance score of each storage node based on at least two of the processor busy parameter value, the memory usage rate and the network busy parameter value corresponding to each storage node, and respective weights of each parameter value.

In some embodiments, a step of determining the first storage node and the second storage node based on a preset score threshold and respective corresponding performance scores of the plurality of storage nodes includes:

determining a storage node with a performance score smaller than the preset score threshold and the smallest performance score as the first storage node;
determining the second storage node from the storage nodes whose performance score is greater than or equal to the preset score threshold.

In some embodiments, detecting states of the plurality of storage nodes includes: performing at least one of the following detections on each of the storage nodes, and a first detection module is configured to perform at least one of the following:

detecting a duration that a processor of the storage node is in a target busy state in a unit time to obtain a processor busy parameter value of the storage node;
detecting an average capacity of a memory used on the storage node in unit time to obtain a memory usage rate;
detecting a ratio between a data flow on the storage node and a network bandwidth in unit time to obtain a network busy parameter value.

The fourth embodiment corresponds to the first embodiment, and the relevant points can be referred to the records of the first embodiment, and will not be repeated here.

Figure 5:
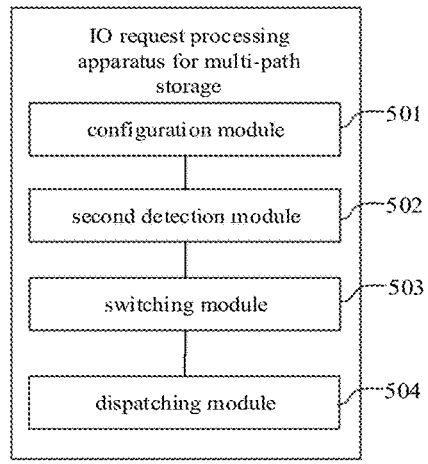
FIG. 5 schematically shows a structural diagram of an IO request processing apparatus for multi-path storage according to a fifth embodiment of the present disclosure.

Based on the same inventive concept, the present disclosure also provides an IO request processing apparatus for multi-path storage, as shown in FIG. 5, which is applied to a host, the host is connected to a storage system, and the storage system includes a plurality of storage nodes, wherein the apparatus includes:

a configuration module 501, configured to determine a plurality of path devices corresponding to a target volume in the storage system, wherein the target volume is divided into a plurality of segments and stored on the plurality of storage nodes, and the plurality of storage nodes respectively correspond to the plurality of path devices;
a second detection module 502, configured to detect respective efficiency of processing requests of the plurality of the path devices;
a switching module 503, configured to generate path switching information for path devices based on a detection result, wherein the path switching information is used to indicate switching of the path devices that process an IO request of the segments;
a dispatching module 504, configured to send the IO request for the segments to switched path devices based on the path switching information, and/or sending the IO request for the segments to the path device corresponding to an optimal storage node based on mapping relationship sent by the storage system;
wherein the optimal storage node is the storage node corresponding to the segment in the mapping relationship.

In some embodiments, the switching module 503 includes:

a path device determination unit, configured to determine a first path device and at least one second path device based on the detection result; wherein at least one target IO request in the first path device is to be transferred to the second path device;
a generation unit, configured to generate the path switching information based on the first path device and the second path device and a target segment targeted by the target IO request.

In some embodiments, in the case that sending the plurality of IO requests based on the path switching information, the dispatching module 504 is configured to transfer the target IO request to be processed in the first path device to at least one second path device, so that the second path device is capable to process the target IO request.

In some embodiments, a second detection module includes:

a number detection module, configured to detect a number of IO requests processed by each path device in a unit time and a number of IO requests currently to be processed;
a path device determination unit, configured to:
determine a waiting time of each IO request to be processed in the path device based on the number of IO requests processed by each path device in the unit time and the number of IO requests to be processed;
determine the first path device and at least one second path device based on the waiting time.

In some embodiments, a step of determining the first path device and at least one second path device based on the waiting time includes:

determining the path device with the longest waiting time as the first path device;
determining the path device with the shortest waiting time as the second path device.

In some embodiments, a step of including a plurality of the target IO requests, and determining the first path device and at least one second path device based on the waiting time, includes:

determining a first maximum waiting time corresponding to the IO request to be processed in the second path device and a second maximum waiting time corresponding to the IO request to be processed in the first path device after all the target IO requests in the first path device are mapped to one second path device;
if the first waiting time is not greater than the second waiting time, mapping all the target IO requests to one second path device;
if the first maximum waiting time is greater than the second waiting time, determining at least one second path device from a plurality of third path devices;
wherein the third path device is a device whose waiting time is shorter than that of the first path device.

In some embodiments, a step of including a plurality of the second path devices and a plurality of the target IO requests, and transferring at least one target IO request to be processed in the first path device to at least one second path device includes:

determining a number of target IO requests transferred to each second path device based on respective corresponding efficiency of processing requests of the plurality of second path devices;

transferring the plurality of target IO requests to the plurality of second path devices respectively according to the number of target IO requests transferred to each second path device;

wherein one of the second path devices is transferred with one or more of the target IO requests.

In some embodiments, a step of transferring the target IO request to be processed in the first path device to at least one second path device includes:

transferring the last target IO request in the first path device to the second path device in the case that there is one of the target IO requests;

transferring the plurality of the target IO requests ranked behind in the first path device respectively to at least one second path device in the case that there are the plurality of the target IO requests.

In some embodiments, the apparatus further includes a target IO request determination module, configured to determine target IO requests, which includes:

an average waiting time determination unit, configured to determine the longest waiting time corresponding to the first path device and an average waiting time of the longest waiting time corresponding to the second path device;

a number determination unit, configured to determine a target number of IO requests to be transferred based on the average waiting time;

a request determination unit, configured to determine the target number of IO requests ranked behind in the first path device as the target IO requests to be transferred.

In some embodiments, the apparatus further includes:

an information sending module, configured to send the path switching information to the storage system, to make the storage system to adjust the mapping relationship based on the path switching information and/or respective state parameters of the plurality of storage nodes detected in every cycle.

The fifth embodiment corresponds to the second embodiment, and the relevant points can be referred to the records of the first embodiment, and will not be repeated here.

Figure 6:
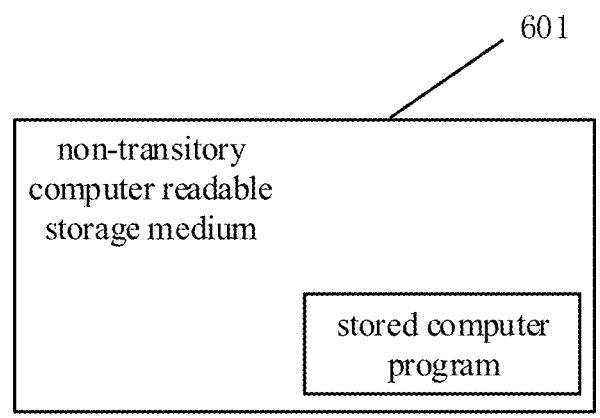
FIG. 6 schematically shows the structural diagram of a non-transitory computer readable storage medium provided by the present disclosure.

Based on the same inventive concept, referring to FIG. 6, the present disclosure also provides a non-transitory computer readable storage medium, wherein a computer program stored therein causes a processor to execute the multi-path storage IO request processing method according to the first embodiment and the second embodiment.

Figure 7:
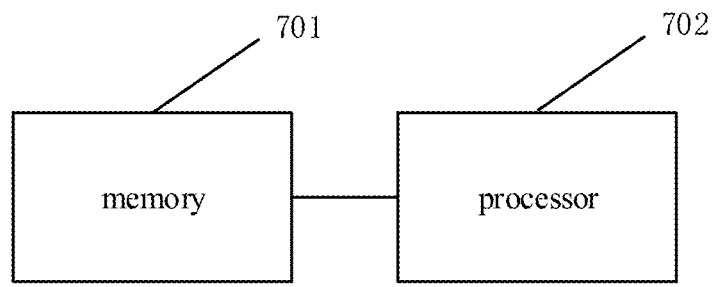
FIG. 7 schematically shows a structural diagram of an electronic device provided by the present disclosure.

Based on the same inventive concept, referring to FIG. 7, the present disclosure also provides an electronic device, including a memory, a processor, and a computer program stored in the memory and executable on the processor to implement the IO request processing method according to the first embodiment and the second embodiment.

Finally, it should be noted that, unless otherwise defined, the words "first", "second" and similar words used in this article do not indicate any order, quantity or importance, but are only used to distinguish different components. Moreover, the terms "containing", "including" or any other variation thereof are intended to cover non-exclusive inclusion, so that a process, method, commodity or equipment including a series of elements includes not only those elements, but also other elements not explicitly listed or elements inherent to such process, method, commodity or equipment. Without more restrictions, the element defined by the sentence "including one" does not exclude that there are other identical elements in the process, method, commodity or equipment including the element. Similar words such as "connected" or "connected" are not limited to physical or mechanical connection, but can include electrical connection, whether direct or indirect.

The IO request processing method, apparatus and system for multi-path storage and storage medium provided by the present disclosure are described in detail above. In this disclosure, the principle and implementation of the present disclosure are expounded with specific examples, and the description of the above embodiments is only used to help understand the method and core idea of the present disclosure. At the same time, according to the idea of this disclosure, there will be changes in the specific implementation and application scope for persons skilled in the art. To sum up, the contents of this specification should not be understood as limitations to this disclosure.

Other embodiments of the present disclosure will easily occur to those skilled in the art after considering the specification and practicing the invention disclosed herein. This disclosure is intended to cover any variations, uses or adaptations of this disclosure, which follow the general principles of this disclosure and include common sense or common technical means in this technical field that are not disclosed in this disclosure. The specification and examples are to be regarded as exemplary only, with the true scope and spirit of the disclosure being indicated by the following claims.

It should be understood that the present disclosure is not limited to the precise structure described above and shown in the drawings, and various modifications and changes can be made without departing from its scope. The scope of the present disclosure is limited only by the appended claims.

Reference herein to "one embodiment", "an embodiment" or "one or more embodiments" means that a particular feature, structure or characteristic described in connection with an embodiment is included in at least one embodiment of the present disclosure. In addition, please note that the word "in one embodiment" here does not necessarily refer to the same embodiment.

In the description provided herein, numerous specific details are set forth. However, it is to be understood that embodiments of the present disclosure may be practiced without these specific details. In some instances, well-known methods, structures and techniques have not been shown in detail so as not to obscure the understanding of this specification.

In the claims, any reference signs placed between parentheses shall not be constructed as limitations on the claims. The word "comprising" does not exclude the presence of elements or steps not listed in a claim. The word "a" or "an" preceding an element does not exclude the presence of a plurality of such elements. The present disclosure can be realized by means of hardware comprising several different elements and by means of a suitably programmed computer. In the unit claim enumerating several means, several of these means can be embodied by one and the same item of hardware. The use of the words first, second, and third does not indicate any order. These words can be interpreted as names.

Finally, it should be explained that the above embodiments are only used to illustrate the technical scheme of this disclosure, but not to limit it; Although the present disclosure has been described in detail with reference to the foregoing embodiments, those skilled in the art should understand that it is still possible to modify the technical solutions described in the foregoing embodiments, or to replace some technical features with equivalents; However, these modifications or substitutions do not make the essence of the corresponding technical solutions deviate from the spirit and scope of the technical solutions of various embodiments of the present disclosure.

The invention claimed is:

1. An IO request processing method for multi-path storage, which is applied to a storage system, wherein the storage system is connected to a host in communication, and the storage system comprises a plurality of storage nodes, the method comprises:
dividing a target volume to obtain a plurality of segments; wherein the target volume is mapped with a plurality of path devices on the host, and the plurality of path devices correspond to a plurality of storage nodes respectively;
determining a mapping relationship between the plurality of segments and the plurality of storage nodes; wherein the mapping relationship is used to identify an optimal storage node mapped by the segment in the plurality of storage nodes;
detecting states of the plurality of storage nodes;
adjusting the mapping relationship based on respective detected state parameters of the plurality of storage nodes and/or path switching information sent by the host; wherein, the path switching information is used to indicate switching of the path devices that process the IO request of the segments;
sending the adjusted mapping relationship to the host, so that the host sends the IO request for the segment to the path device corresponding to the optimal storage node based on the adjusted mapping relationship;
wherein, the method further comprises: determining an initial performance score of each storage node based on at least two of a processor busy parameter value, a memory usage rate and a network busy parameter value corresponding to each storage node; determining performance scores respectively corresponding to the storage nodes based on the initial performance score of each storage node; and in response to the performance score of a storage node is greater than or equal to a preset score threshold, determining the storage node as the optimal storage node;
wherein the method further comprises: determining a first path device and at least one second path device based on the path switching information; wherein at least one target IO request in the first path device is to be transferred to the second path device; when the storage node corresponding to the first path device finishes processing an IO request ranked first processing at least one of the target IO requests by the storage node corresponding to the second path device;
wherein, in the case that the mapping relationship is adjusted based on the path switching information for the path devices sent by the host, the method comprises: adjusting the segment targeted by the target IO request to mapping with the storage node corresponding to the second path device based on the path switching information;
wherein, in the case that the mapping relationship is adjusted based on the path switching information for the path devices sent by the host, the method comprises: determining a switching number of the received path switching information for the first path device and the second path device targeted by each path switching information; adjusting the mapping relationship based on the switching number and the storage node corresponding to the second path device targeted by each path switching information;
wherein, when the mapping relationship is adjusted based on the switching number and the second path device targeted by each path switching information, a adjustment is made when the switching number exceeds a preset number; during the adjustment, the second path device for each path switch and the segment for each transferred target IO request is determined, and the path device that receives the transferred IO request the most times is taken as the second path device, and the segment with the transferred IO request the most is taken as a target segment, so that the storage node mapped by the target segment is adjusted to map with the storage node corresponding to the second path device.

2. The method according to claim 1, wherein in the case that the mapping relationship is adjusted based on the respective detected state parameters of the plurality of storage nodes, the method comprises:
determining a first storage node and a second storage node based on respective state parameters of the plurality of storage nodes; wherein performance of the second storage node in processing IO requests is higher than that of the first storage node;
determining a target segment to which the first storage node is mapped based on the mapping relationship;
determining the second storage node as the optimal storage node mapped with the target segment.

3. The method according to claim 2, wherein determining a first storage node and a second storage node based on respective state parameters of the plurality of storage nodes comprises:
determining respective corresponding performance scores of the plurality of storage nodes based on the respective state parameters of the plurality of storage nodes;
determining the first storage node and the second storage node based on the preset score threshold and the respective corresponding performance scores of the plurality of storage nodes.

4. The method according to claim 3, wherein the state parameters comprise at least two of a processor busy parameter value, a memory usage rate and a network busy parameter value; determining respective corresponding performance scores of the plurality of storage nodes based on respective state parameters of the plurality of storage nodes comprises:
determining the initial performance score of each storage node based on at least two of the processor busy parameter value, the memory usage rate and the network busy parameter value corresponding to each of the storage nodes;
determining performance scores corresponding to the plurality of storage nodes based on initial performance scores corresponding to the plurality of storage nodes.

5. The method according to claim 4, wherein determining an initial performance score of each storage node based on at least two of the processor busy parameter value, the memory usage rate and the network busy parameter value corresponding to each of the storage nodes comprises:
determining the initial performance score of each storage node based on at least two of the processor busy parameter value, the memory usage rate and the network busy parameter value corresponding to each storage node, and respective weights of each parameter value.

6. The method according to claim 3, wherein determining the first storage node and the second storage node based on a preset score threshold and respective corresponding performance scores of the plurality of storage nodes comprises:
  determining a storage node with a performance score smaller than the preset score threshold and the smallest performance score as the first storage node;
  determining the second storage node from the storage nodes whose performance score is greater than or equal to the preset score threshold.

7. The method according to claim 1, wherein detecting states of the plurality of storage nodes comprises: performing at least one of the following detections on each of the storage nodes:
  detecting a duration that a processor of the storage node is in a target busy state in a unit time to obtain a processor busy parameter value of the storage node;
  detecting an average capacity of a memory used on the storage node in unit time to obtain a memory usage rate;
  detecting a ratio between a data flow on the storage node and a network bandwidth in unit time to obtain a network busy parameter value.

8. An IO request processing method for multi-path storage, which is applied to a host, wherein the host is connected to a storage system, and the storage system comprises a plurality of storage nodes, the method comprises:
  determining a plurality of path devices corresponding to a target volume in the storage system, wherein the target volume is divided into a plurality of segments and stored on the plurality of storage nodes, and the plurality of storage nodes respectively correspond to the plurality of path devices;
  detecting respective efficiency of processing requests of the plurality of the path devices;
  generating path switching information for path devices based on a detection result, wherein the path switching information is used to indicate switching of the path devices that process an IO request of the segments;
  sending the IO request for the segments to switched path devices based on the path switching information, and/or sending the IO request for the segments to the path device corresponding to an optimal storage node based on mapping relationship sent by the storage system;
  wherein the optimal storage node is the storage node corresponding to the segment in the mapping relationship;
  wherein generating path switching information for a target IO request in the path device based on the detection result comprises: determining a first path device and at least one second path device based on the detection result; wherein at least one target IO request in the first path device is to be transferred to the second path device; generating the path switching information based on the first path device and the second path device and a target segment targeted by the target IO request;
  wherein sending the IO request for the segments to switched path devices based on the path switching information comprises: transferring the target IO request to be processed in the first path device to at least one second path device, so that the second path device is capable to process the target IO request;
  wherein detecting respective efficiency of processing requests of the plurality of the path devices comprises: detecting a number of IO requests processed by each path device in a unit time and a number of IO requests currently to be processed; determining the first path device and at least one second path device based on the detection result comprising: determining a waiting time of each IO request to be processed in the path device based on the number of IO requests processed by each path device in the unit time and the number of IO requests to be processed; determining the first path device and at least one second path device based on the waiting time;
  wherein, in the case that the mapping relationship is adjusted based on the path switching information for the path devices, the method comprises: determining a switching number of the path switching information for the first path device and the second path device targeted by each path switching information; adjusting the mapping relationship based on the switching number and the storage node corresponding to the second path device targeted by each path switching information;
  wherein, when the mapping relationship is adjusted based on the switching number and the second path device targeted by each path switching information, a adjustment is made when the switching number exceeds a preset number; during the adjustment, the second path device for each path switch and the segment for each transferred target IO request is determined, and the path device that receives the transferred IO request the most times is taken as the second path device, and the segment with the transferred IO request the most is taken as a target segment, so that the storage node mapped by the target segment is adjusted to map with the storage node corresponding to the second path device.

9. The method according to claim 8, wherein determining the first path device and at least one second path device based on the waiting time comprises:
  determining the path device with the longest waiting time as the first path device;
  determining the path device with the shortest waiting time as the second path device.

10. The method according to claim 8, comprising a plurality of the target IO requests, and determining the first path device and at least one second path device based on the waiting time, comprising:
  determining a first maximum waiting time corresponding to the IO request to be processed in the second path device and a second maximum waiting time corresponding to the IO request to be processed in the first path device after all the target IO requests in the first path device are mapped to one second path device;
  if the first waiting time is not greater than the second waiting time, mapping all the target IO requests to one second path device;
  if the first maximum waiting time is greater than the second waiting time, determining at least one second path device from a plurality of third path devices;
  wherein the third path device is a device whose waiting time is shorter than that of the first path device.

11. The method according to claim 8, comprising a plurality of the second path devices and a plurality of the target IO requests, and transferring at least one target IO request to be processed in the first path device to at least one second path device comprising:
  determining a number of target IO requests transferred to each second path device based on respective corresponding efficiency of processing requests of the plurality of second path devices;

transferring the plurality of target IO requests to the plurality of second path devices respectively according to the number of target IO requests transferred to each second path device;
wherein one of the second path devices is transferred with one or more of the target IO requests.

12. The method according to claim 8, wherein transferring the target IO request to be processed in the first path device to at least one second path device comprises:
transferring the last target IO request in the first path device to the second path device in the case that there is one of the target IO requests;
transferring the plurality of the target IO requests ranked behind in the first path device respectively to at least one second path device in the case that there are the plurality of the target IO requests.

13. The method according to claim 8, wherein the target IO request is determined by the following steps:
determining the longest waiting time corresponding to the first path device and an average waiting time of the longest waiting time corresponding to the second path device;
determining a target number of IO requests to be transferred based on the average waiting time;
determining the target number of IO requests ranked behind in the first path device as the target IO requests to be transferred.

14. A processing system comprising a storage system and a host, wherein:
the storage system is configured to execute an IO request processing method for multi-path storage, which is applied to the storage system, wherein the storage system is connected to the host in communication, and the storage system comprises a plurality of storage nodes, the method comprises:
dividing a target volume to obtain a plurality of segments; wherein the target volume is mapped with a plurality of path devices on the host, and the plurality of path devices correspond to a plurality of storage nodes respectively;
determining a mapping relationship between the plurality of segments and the plurality of storage nodes; wherein the mapping relationship is used to identify an optimal storage node mapped by the segment in the plurality of storage nodes;
detecting states of the plurality of storage nodes;
adjusting the mapping relationship based on respective detected state parameters of the plurality of storage nodes and/or path switching information sent by the host; wherein, the path switching information is used to indicate switching of the path devices that process the IO request of the segments;
sending the adjusted mapping relationship to the host, so that the host sends the IO request for the segment to the path device corresponding to the optimal storage node based on the adjusted mapping relationship;
wherein, the method further comprises: determining an initial performance score of each storage node based on at least two of a processor busy parameter value, a memory usage rate and a network busy parameter value corresponding to each storage node; determining performance scores respectively corresponding to the storage nodes based on the initial performance score of each storage node; and in response to the performance score of a storage node is greater than or equal to a preset score threshold, determining the storage node as the optimal storage node;
wherein the method further comprises:
determining a first path device and at least one second path device based on the path switching information; wherein at least one target IO request in the first path device is to be transferred to the second path device;
when the storage node corresponding to the first path device finishes, processing an IO request ranked first processing at least one of the target IO requests by the storage node corresponding to the second path device;
wherein, in the case that the mapping relationship is adjusted based on the path switching information for the path devices sent by the host, the method comprises:
determining a switching number of the received path switching information for the first path device and the second path device targeted by each path switching information;
adjusting the mapping relationship based on the switching number and the storage node corresponding to the second path device targeted by each path switching information;
wherein, when the mapping relationship is adjusted based on the switching number and the second path device targeted by each path switching information, a adjustment is made when the switching number exceeds a preset number; during the adjustment, the second path device for each path switch and the segment for each transferred target IO request is determined, and the path device that receives the transferred IO request the most times is taken as the second path device, and the segment with the transferred IO request the most is taken as a target segment, so that the storage node mapped by the target segment is adjusted to map with the storage node corresponding to the second path device;
the host is configured to execute an IO request processing method for multi-path storage, which is applied to the host, wherein the host is connected to the storage system, and the storage system comprises a plurality of storage nodes, the method comprises:
determining a plurality of path devices corresponding to a target volume in the storage system, wherein the target volume is divided into a plurality of segments and stored on the plurality of storage nodes, and the plurality of storage nodes respectively correspond to the plurality of path devices;
detecting respective efficiency of processing requests of the plurality of the path devices;
generating path switching information for path devices based on a detection result, wherein the path switching information is used to indicate switching of the path devices that process an IO request of the segments;
sending the IO request for the segments to switched path devices based on the path switching information, and/or sending the IO request for the segments to the path device corresponding to an optimal storage node based on mapping relationship sent by the storage system;
wherein the optimal storage node is the storage node corresponding to the segment in the mapping relationship;
wherein generating path switching information for a target IO request in the path device based on the detection result comprises:
determining a first path device and at least one second path device based on the detection result; wherein at least one target IO request in the first path device is to be transferred to the second path device;

generating the path switching information based on the first path device and the second path device and a target segment targeted by the target IO request;

wherein detecting respective efficiency of processing requests of the plurality of the path devices comprises:

detecting a number of IO requests processed by each path device in a unit time and a number of IO requests currently to be processed;

determining the first path device and at least one second path device based on the detection result comprising:

determining a waiting time of each IO request to be processed in the path device based on the number of IO requests processed by each path device in the unit time and the number of IO requests to be processed;

determining the first path device and at least one second path device based on the waiting time.

* * * * *